US007543053B2

(12) United States Patent
Goodman et al.

(10) Patent No.: US 7,543,053 B2
(45) Date of Patent: Jun. 2, 2009

(54) INTELLIGENT QUARANTINING FOR SPAM PREVENTION

(75) Inventors: Joshua T. Goodman, Redmond, WA (US); Robert L. Rounthwaite, Fall City, WA (US); Geoffrey J. Hulten, Lynnwood, WA (US); Derek Hazeur, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 587 days.

(21) Appl. No.: 10/779,295

(22) Filed: Feb. 13, 2004

(65) Prior Publication Data
US 2004/0215977 A1    Oct. 28, 2004

Related U.S. Application Data

(63) Continuation-in-part of application No. 10/378,463, filed on Mar. 3, 2003, now Pat. No. 7,219,148.

(51) Int. Cl.
G06F 15/173    (2006.01)
(52) U.S. Cl. .................. 709/224; 709/223; 709/206; 713/154
(58) Field of Classification Search ......... 709/206–207, 709/223–224, 217; 713/154
See application file for complete search history.

(56) References Cited

U.S. PATENT DOCUMENTS

| 5,377,354 A | 12/1994 | Scannell et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |
| 5,884,033 A | 3/1999 | Duvall et al. |

(Continued)

FOREIGN PATENT DOCUMENTS

EP    413 537    2/1991

(Continued)

OTHER PUBLICATIONS

Federal Trade Commission. "False Claims in Spam", A report by the FTC's division of marketing practices, Apr. 30, 2003, http://www.ftc.gov/reports/spam/030429spamreport.pdf.

(Continued)

Primary Examiner—Philip B Tran
(74) Attorney, Agent, or Firm—Amin, Turocy & Calvin, LLP

(57) ABSTRACT

The subject invention provides for an intelligent quarantining system and method that facilitates a more robust classification system in connection with spam prevention. The invention involves holding back some messages that appear to be questionable, suspicious, or untrustworthy from classification (as spam or good). In particular, the filter lacks information about these messages and thus classification is temporarily delayed. This provides more time for a filter update to arrive with a more accurate classification. The suspicious messages can be quarantined for a determined time period to allow more data to be collected regarding these messages. A number of factors can be employed to determine whether messages are more likely to be flagged for further analysis. User feedback by way of a feedback loop system can also be utilized to facilitate classification of the messages. After some time period, classification of the messages can be resumed.

41 Claims, 10 Drawing Sheets

U.S. PATENT DOCUMENTS

| | | |
|---|---|---|
| 5,905,859 A | 5/1999 | Holloway et al. |
| 6,003,027 A | 12/1999 | Prager |
| 6,023,723 A | 2/2000 | McCormick et al. |
| 6,047,242 A | 4/2000 | Benson |
| 6,052,709 A | 4/2000 | Paul |
| 6,072,942 A | 6/2000 | Stockwell et al. |
| 6,101,531 A | 8/2000 | Eggleston et al. |
| 6,112,227 A | 8/2000 | Heiner |
| 6,122,657 A | 9/2000 | Hoffman, Jr. et al. |
| 6,161,130 A | 12/2000 | Horvitz et al. |
| 6,167,434 A | 12/2000 | Pang |
| 6,199,102 B1 | 3/2001 | Cobb |
| 6,308,273 B1 | 10/2001 | Goertzel et al. |
| 6,314,421 B1 | 11/2001 | Sharnoff et al. |
| 6,321,267 B1 | 11/2001 | Donaldson |
| 6,327,617 B1 | 12/2001 | Fawcett |
| 6,330,590 B1 | 12/2001 | Cotten |
| 6,351,740 B1 | 2/2002 | Rabinowitz |
| 6,370,526 B1 | 4/2002 | Agrawal et al. |
| 6,393,465 B2 | 5/2002 | Leeds |
| 6,421,709 B1 | 7/2002 | McCormick et al. |
| 6,424,997 B1 | 7/2002 | Buskirk, Jr. et al. |
| 6,434,600 B2 | 8/2002 | Waite et al. |
| 6,453,327 B1 | 9/2002 | Nielsen |
| 6,477,551 B1 | 11/2002 | Johnson et al. |
| 6,484,197 B1 | 11/2002 | Donohue |
| 6,484,261 B1 | 11/2002 | Wiegel |
| 6,505,250 B2 | 1/2003 | Freund et al. |
| 6,546,416 B1 | 4/2003 | Kirsch |
| 6,592,627 B1 | 7/2003 | Agrawal et al. |
| 6,615,242 B1 | 9/2003 | Riemers |
| 6,633,855 B1 | 10/2003 | Auvenshine |
| 6,643,686 B1 | 11/2003 | Hall |
| 6,684,201 B1 | 1/2004 | Brill |
| 6,691,156 B1 | 2/2004 | Drummond et al. |
| 6,701,350 B1 | 3/2004 | Mitchell |
| 6,701,440 B1 | 3/2004 | Kim et al. |
| 6,728,690 B1 | 4/2004 | Meek et al. |
| 6,732,149 B1 | 5/2004 | Kephart |
| 6,732,157 B1 | 5/2004 | Gordon et al. |
| 6,732,273 B1 | 5/2004 | Byers |
| 6,742,047 B1 | 5/2004 | Tso |
| 6,748,422 B2 * | 6/2004 | Morin et al. ................. 709/206 |
| 6,751,348 B2 | 6/2004 | Buzuloiu et al. |
| 6,757,830 B1 | 6/2004 | Tarbotton et al. |
| 6,768,991 B2 | 7/2004 | Hearnden |
| 6,775,704 B1 | 8/2004 | Watson et al. |
| 6,779,021 B1 | 8/2004 | Bates et al. |
| 6,785,820 B1 | 8/2004 | Muttik |
| 6,842,773 B1 | 1/2005 | Ralston et al. |
| 6,853,749 B2 | 2/2005 | Watanabe et al. |
| 6,915,334 B1 | 7/2005 | Hall |
| 6,920,477 B2 | 7/2005 | Mitzenmacher |
| 6,928,465 B2 | 8/2005 | Earnest |
| 6,971,023 B1 | 11/2005 | Makinson et al. |
| 7,003,555 B1 | 2/2006 | Jungck |
| 7,032,030 B1 | 4/2006 | Codignotto |
| 7,051,077 B2 * | 5/2006 | Lin .............................. 709/207 |
| 7,117,358 B2 * | 10/2006 | Bandini et al. ............... 713/153 |
| 7,146,402 B2 | 12/2006 | Kucherawy |
| 7,155,243 B2 | 12/2006 | Baldwin et al. |
| 7,155,484 B2 * | 12/2006 | Malik ......................... 709/206 |
| 7,188,369 B2 | 3/2007 | Ho et al. |
| 7,219,148 B2 | 5/2007 | Rounthwaite et al. |
| 7,249,162 B2 | 7/2007 | Rounthwaite et al. |
| 7,263,607 B2 | 8/2007 | Ingerman et al. |
| 7,293,063 B1 | 11/2007 | Sobel |
| 7,320,020 B2 | 1/2008 | Chadwick et al. |
| 2001/0046307 A1 | 11/2001 | Wong |
| 2002/0016956 A1 | 2/2002 | Fawcett |
| 2002/0059425 A1 | 5/2002 | Belfiore et al. |
| 2002/0073157 A1 | 6/2002 | Newman et al. |
| 2002/0091738 A1 | 7/2002 | Rohrabaugh et al. |
| 2002/0124025 A1 | 9/2002 | Janakiraman et al. |
| 2002/0147782 A1 | 10/2002 | Dimitrova et al. |
| 2002/0174185 A1 | 11/2002 | Rawat et al. |
| 2002/0184315 A1 | 12/2002 | Earnest |
| 2002/0199095 A1 | 12/2002 | Bandini et al. |
| 2003/0009495 A1 | 1/2003 | Adjaoute |
| 2003/0009698 A1 | 1/2003 | Lindeman et al. |
| 2003/0016872 A1 | 1/2003 | Sun |
| 2003/0037074 A1 | 2/2003 | Dwork et al. |
| 2003/0041126 A1 | 2/2003 | Buford et al. |
| 2003/0088627 A1 | 5/2003 | Rothwell et al. |
| 2003/0149733 A1 | 8/2003 | Capiel |
| 2003/0167311 A1 | 9/2003 | Kirsch |
| 2003/0191969 A1* | 10/2003 | Katsikas ...................... 713/201 |
| 2003/0204569 A1 | 10/2003 | Andrews et al. |
| 2003/0320054 | 10/2003 | Cheng et al. |
| 2003/0229672 A1 | 12/2003 | Kohn |
| 2004/0003283 A1 | 1/2004 | Goodman et al. |
| 2004/0015554 A1 | 1/2004 | Wilson |
| 2004/0019650 A1 | 1/2004 | Auvenshine |
| 2004/0054887 A1 | 3/2004 | Paulsen et al. |
| 2004/0073617 A1 | 4/2004 | Milliken et al. |
| 2004/0083270 A1 | 4/2004 | Heckerman et al. |
| 2004/0093371 A1 | 5/2004 | Burrows et al. |
| 2004/0139160 A1 | 7/2004 | Wallace et al. |
| 2004/0139165 A1 | 7/2004 | McMillan et al. |
| 2004/0148330 A1* | 7/2004 | Alspector et al. ............ 709/200 |
| 2004/0177120 A1 | 9/2004 | Kirsch |
| 2004/0199585 A1 | 10/2004 | Wang |
| 2004/0199594 A1 | 10/2004 | Radatti et al. |
| 2004/0210640 A1* | 10/2004 | Chadwick et al. ........... 709/207 |
| 2004/0215977 A1 | 10/2004 | Goodman et al. |
| 2004/0255122 A1* | 12/2004 | Ingerman et al. ............ 713/176 |
| 2004/0260776 A1 | 12/2004 | Starbuck et al. |
| 2005/0015455 A1 | 1/2005 | Liu |
| 2005/0050150 A1 | 3/2005 | Dinkin |
| 2005/0060643 A1 | 3/2005 | Glass et al. |
| 2005/0076084 A1* | 4/2005 | Loughmiller et al. ....... 709/206 |
| 2005/0080855 A1 | 4/2005 | Murray |
| 2005/0080889 A1 | 4/2005 | Malik et al. |
| 2005/0081059 A1 | 4/2005 | Bandini et al. |
| 2005/0091321 A1* | 4/2005 | Daniell et al. ............... 709/206 |
| 2005/0097174 A1 | 5/2005 | Daniell |
| 2005/0102366 A1 | 5/2005 | Kirsch |
| 2005/0114452 A1* | 5/2005 | Prakash ....................... 709/206 |
| 2005/0120019 A1* | 6/2005 | Rigoutsos et al. .............. 707/6 |
| 2005/0159136 A1 | 7/2005 | Rouse et al. |
| 2005/0160148 A1* | 7/2005 | Yu ............................... 709/206 |
| 2005/0165895 A1* | 7/2005 | Rajan et al. ................. 709/206 |
| 2005/0182735 A1 | 8/2005 | Zager et al. |
| 2005/0188023 A1 | 8/2005 | Doan et al. |
| 2005/0204159 A1 | 9/2005 | Davis et al. |
| 2006/0031303 A1 | 2/2006 | Pang |
| 2006/0031306 A1 | 2/2006 | Haverkos |
| 2006/0036701 A1 | 2/2006 | Bulfer et al. |
| 2006/0123083 A1 | 6/2006 | Goutte et al. |
| 2006/0265498 A1 | 11/2006 | Turgeman et al. |
| 2007/0101423 A1 | 5/2007 | Oliver et al. |
| 2007/0130350 A1 | 6/2007 | Alperovitch et al. |
| 2007/0130351 A1 | 6/2007 | Alperovitch et al. |
| 2007/0133034 A1 | 6/2007 | Jindal et al. |
| 2008/0104186 A1 | 5/2008 | Wieneke et al. |

FOREIGN PATENT DOCUMENTS

| | | |
|---|---|---|
| EP | 720 333 | 7/1996 |
| EP | 1376427 | 3/2003 |
| EP | 1376427 A2 | 1/2004 |
| EP | 1376427 A3 | 1/2004 |
| WO | WO 96/35994 | 11/1996 |
| WO | 9967731 | 12/1999 |

| WO | WO 02/071286 | 9/2002 |
| WO | 03054764 | 7/2003 |
| WO | WO 2004/059506 | 7/2004 |

OTHER PUBLICATIONS

Hansell. "Internet is losing ground in battle against spam", The New York TImes: Technology section, Apr. 22, 2003, 2003.
European Search report dated Feb. 23, 2007, mailed Feb. 28, 2007 for European Patent Application Serial No. 05105308, 4 pages.
European Search Report dated Jul. 5, 2006, mailed Jul. 24, 2006 for European Application No. EP 06 01 2631. 3 pages.
European Search Report dated Apr. 6, 2006 and mailed Apr. 6, 2006 for EP 04102242, 3 pages.
Graham. "The Future of Spam" (2003) Computer Journal, CSI Computer Security Institute, vol. 19, No. 1, 6 pages.
International Search Report dated Jan. 17, 2006, mailed Jan. 31, 2006, for PCT Application Serial No. PCT/US04/05501, 2 Pages.
Written Opinion of the International Preliminary Examining Authority mailed Nov. 30, 2005 for PCT/US03/41526, 5 pages.
U.S. Appl. No. 10/208,150, filed Jul. 29, 2002, Andaker.
U.S. Appl. No. 09/893,941, filed Jun. 28, 2001, Horviz.
U.S. Appl. No. 10/278,591, filed Oct. 23, 2002, Heckerman.
U.S. Appl. No. 10/180,565, filed Jun. 26, 2002, Goodman.
U.S. Appl. No. 09/497,992, filed Feb. 4, 2000, Maller.
U.S. Appl. No. 10/291,260, filed Nov. 8, 2002, Burrows.
Breiman, Friedman, Olshen, and Stone. "Classification and Regression Trees." Wadsworth & Brooks, Monterey, CA (1984).
Quinlan. "C4.5: Programs for Machine Learning." Morgan Kauffmann, San Francisco, CA (1993).
Hayes, Brian. "Spam, Spam, Spam, Lovely Spam." American Scientist Online, Jun. 30, 2003. pp. 1-6. vol. 91.
European Search Report, dated Jun. 9, 2005, mailed Aug. 22, 2005 for European Patent Application Serial No. EP04011978, 12 pages.
Partial European Search Report, EP33823TE900kap, mailed Jun. 21, 2005.
Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.
Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.
Graham, P., The Future of Spam, Computer Security Journal, CSI Computer Security Institute, vol. 19, No. 1, Jan. 2003, pp. 1-5.
Graham, P., A Plan for Spam, Online!, Aug. 2002, XP002273602, http://www.paulgraham.com/spam.html, retrieved on Mar. 12, 2004.
European Search Report, EP31087TE900, mailed Nov. 11, 2004.
J. Byrne, My Spamblock, Google, Jan. 19, 1997, 2 pages.
D. F. Skoll, How to Make Sure a Human is Sending You Mail, Google, Nov. 17, 1996, 2 pages.
L. M. Bowman, Hotmail Spam Filters Block Outgoing E-Mail, CNET NEWS.COM, Jan. 18, 2001, 3 pages.
P.Y. Simard, et al., Using Character Recognition and Segmentation to Tell Computer from Humans, International Conference on Document Analysis and Recognition (ICDAR), IEEE Computer Society, 2000, pp. 418-423.
S. Li et al., Secure Human-Computer Identification against Peeping: A Survey, Microsoft Research, 2003, 53 pages.
D.A. Turner et al., Controlling Spam through Lightweight Currency, In Proc. of the Hawaii International Conference on Computer Sciences, Jan. 2004, 9 pages.
Daphne Koller, et al., Toward Optimal Feature Selection, Proc. of the Thirteenth International Conference, 1996, 9 pages.
David Dolan Lewis, Representation and Learning in Information Retrieval, University of Massachusetts, 1992.
Cynthia Dwork, et al.; "Pricing Via Processing or Combatting Junk Mail"; Presented at Crypto '92; pp. 1-11.
Thorsten Joachims; "Text Categorization with Support Vector Machines: Learning with Many Relevant Features"; LS-8 Report 23, Nov. 1997, 18 pages.
Daphne Koller, et al.; "Hierarchically Classifying Doucments Using Very Few Words"; In ICML-97: Proceedings of the Fourteenth International Conference on Machine Learning; San Francisco, CA: Morgan Kaufmann 1997; 9 pages.
Ellen Spertus; "Smokey: Automatic Recognition of Hostile Messages"; Proceedings of the Conference on Innovative Applications in Artificial Intelligence (IAAI), 1997, 8 pages.
Hinrich Schutze, et al.; "A Comparison of Classifiers and Document Representations for the Routing Problem"; Proceedings of the 18th Annual International ACM SIGIR Conference on Research and Development in Information Retrieval, Seattle, WA, Jul. 9-13, 1995; pp. 229-237.
Yiming Yang, et al.; "A Comparative Study on Feature Selection in Text Categorization"; School of Computer Science, Carnegie Mellon University, Pittsburgh, PA, and Verity, Inc., Sunnyvale, CA; 9 pages.
David D. Lewis, et al.; "A Comparison of Two Learning Algorithms for Text Categorization"; Third Annual Symposium on Document Analysis and Information Retrieval; Apr. 11-13, 1994; pp. 81-93.
Mehran Sahami; "Learning Limited Dependence Bayesian Classifiers"; In KDD-96: Proceedings of the Second International Conference on Knowledge Discovery and Data Mining; AAAI Press, 1996; Menlo Park, CA; pp. 335-338.
William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.
Makoto Iwayama, et al., Hierarchical Bayesian Clustering for Automatic Text Classifiation, Natural Language, 1995, pp. 1322-1327.
David D. Lewis, An Evaluation of Phrasal and Clustered Representations on a Text Categorization Task, 15th Annual International SIGIR '92, Denmark 1992, pp. 37-50.
Daphne Koller, et al, Toward Optimal Feature Selection, Machine Learning Proc. of the Thirteenth International Conference, Morgan Kaufmann, 1996, 9 pages.
David Dolan Lewis, Representation and Learning in Information Retrieval, University of Massachusetts, 1992.
Tom Mitchell, Machine Learning, Carnegie Mellon University, Bayesian Learning, Chapter 6, pp. 180-184.
Y. H. Li, et al., Classification of Text Documents, The Computer Journal, vol. 41, No. 8, 1998; pp. 537-546.
Juha Takkinen, et al., CAFE: A Conceptual Model for Managing Information in Electronic Mail, Laboratory for Intelligent Information Systems, Department of Computer and Information Science, Linkoping University, Sweden, Conference on System Sciences, 1998 IEEE.
Jacob Palme, et al., Issues When Designing Filters in Messaging Systems, Computer Communications, 1996, pp. 95-101, Stockholm. Sweden.
Richard B. Segal, et al., SwiftFile: An Intelligent Assistant for Organizing E-Mail, In Proceedings of the Third International Conference on Autonomous Agents, May 1999, 7 pages.
Mehran Sahami, et al., A Batesian Approach to Filtering Junk E-Mail, AAAI Workshop on Learning for Text Categorization, Jul. 1998, 8 pages, Madison, Wisconsin, USA.
David Madigan, Statistics and The War on Spam, Rutgers University, pp. 1-13, 2003.
Padraig Cunningham, et al., A Case-Based Approach to Spam Filtering that Can Track Concept Drift, In The ICCBR'03 Workshop on Long-Lived CBR Systems, Jun. 2003, 9 pages, Trondheim, Norway.
Mark Rosen, E-mail Classification in the Haystack Framework, Massachusetts Institute of Technology, Feb. 2003, 103 pages.
Thorsten Joachims, Transductive Inference for Text Classification Using Support Vector Machines, In Proceedings of the 16th International Conference on Machine Learning, 1999, pp. 200-209, San Francisco, California, USA.
John Wong, Preventing Spams and Relays, Linux Journal, Dec. 1998, 6 pages, vol. 1998 Issue 56es, Specialized Systems Consultants, Inc.
Meng Weng Wong, SPF Overview, Linux Journal, Apr. 2004, 6 pages, vol. 2004 Issue 120, Specialized Systems Consultants, Inc.
Stop, in the Name of Spam, Communications of the ACM, Nov. 1998, pp. 11-14, vol. 41 No. 11.
Eric Allman, Spam, Spam, Spam, Spam, Spam, the FTC, and Spam, Queue, Sep. 2003, pp. 62-69, vol. 1 Issue 6.

Tom Fawcett, "In vivo" Spam Filtering: A Challenge Problem for KDD, SIGKDD Explorations, Dec. 2003, pp. 140-148, vol. 5 Issue 2.

J.D.M. Rennie. ifile: An Application of Machine Learning to E-Mail Filtering, Proceedings of the KDD-2000 Workshop on Text Mining, Sixth ACM SIGKDD International Conference on Knowledge Discovery and Data Mining, 2000. 6 pages.

S. Argamon, et al., Routing documents according to style, In First International Workshop on Innovative Information Systems, 1998, 8 pages.

K. Mock, An Experimental Framework for Email Categorization and Management, Proceedings of the 24th Annual International ACM SIGIR Conference, 2001, pp. 392-393.

Jose Maria Gomez Hidalgo, Evaluating Cost-Sensitive Unsolicited Bulk Email Categorization, SAC 2002, 2002, pp. 615-620, Madrid, Spain.

A.Z. Broder, et al. Syntactic Clustering of the Web, SRC Technical Note, Digital Corporation, Jul. 25, 1997, 13 pages.

Fabrizio Sebastiani, Machine Learning in Automated Text Categorization, ACM Computing Surveys, 2002, pp. 1-47, vol. 34-Issue 1.

I. Androutsopoulos, et al., Learning to Filter Spam E-mail: A Comparison of a Naive Bayesian and a Memory-based Approach, 4th PKDD's Workshop on Machine Learning and Textual Information Access, 2000, 13 pages.

D. Turner et al., Payment-based Email, 5th International Conference on Software Engineering, Artificial Intelligence, Networking, and Parallel/Distributed Computing, Jun. 2004, 7 pages.

Cormac O'Brien, et al., Spam Filters: Bayes vs. Chi-squared; Letters vs. Words, Proceedings of the 1st international symposium on information and communication technologies, 2003, pp. 291-296, Dublin, Ireland.

Olle Balter, et al., Bifrost Inbox Organizer: Giving users control over the inbox, NordiCHI Oct. 2002, 2002, pp. 111-118, Arhus, Denmark.

Lorrie Faith Cranor, et al., Spam!, Communications of the ACM, 1998, pp. 74-83, vol. 41-No. 8.

P.Y. Simard, et al., Using Character Recognition and Segmentation to Tell Computer from Humans, International Conference on Document Analysis and Recognition (ICDAR), IEEE Computer Society, 2000, pp. 418-423.

S. Li et al., Secure Human-Computer Identification against Peeping: A Survey, Microsoft Research, 2003, 53 pages.

D.A. Turner et al., Controlling Spam through Lightweight Currency, In Proc. of the Hawaii International Conference on Computer Sciences, Jan. 2004, 9 pages.

I. Androutsopoulos, J. Koutsias, K.V. Chandrinos, C.D. Spyropoulos. An Experimental Comparison of Native Bayesian and Keyword-based Anti-spam Filtering with Personal E-mail Messages. Proceedings of the 23rd ACM SIGIR Conference, pp. 160-167, 2000.

Kevin R. Gee. Using Latent Semantic Indexing to Filter Spam. Proceedings of the 2003 ACM Symposium on Applied Computing, pp. 460-464, 2003.

P. Pantel and D. Lin. SpamCop: A Spam Classification & Organization Program. In Proc. AAAI-1998 Workshop on Learning for Text Categorization, 1998. 8 pages.

G. Manco, E. Masciari, M. Ruffolo, and A. Tagarelli. Towards an Adaptive Mail Classifier. In Proc. of Italian Association for Artificial Intelligence Workshop, 2002. 12 pages.

"MIME", The Microsoft Computer Dictionary. 5th ed. Redmond, WA; Microsoft Press. May 1, 2002.

Ron White, How Computers Work, 2004, QUE Publishing, pp. 238-239.

Michael S. Mimoso, "Quick Takes: Image Analysis, Filtering Comes to E-mail Security", http://searchsecurity.techtarget.com/originalContent.html (Feb. 5, 2002).

"Clearswift Announces the Most Complete e-Policy-Based Email Content Security Product for Service Providers", http://www.clearswift.com/news/item.aspx?ID=144. (Oct. 12, 2002).

* cited by examiner

INTELLIGENT QUARANTINING FOR SPAM PREVENTION

CROSS REFERENCE TO RELATED APPLICATION

This application is a continuation-in part of U.S. application Ser. No. 10/378,463, entitled *Feedback Loop for Spam Prevention* and filed on Mar. 3, 2003, now U.S. Pat. No. 7,219,148 the entirety of which is incorporated herein by reference.

TECHNICAL FIELD

This invention is related to systems and methods for identifying both legitimate (e.g., good mail) and undesired information (e.g., junk mail), and more particularly to classifying messages for spam prevention in part by at least delaying delivery of suspicious messages until further information can be gathered about the messages to facilitate classification of such messages.

BACKGROUND OF THE INVENTION

The advent of global communications networks such as the Internet has presented commercial opportunities for reaching vast numbers of potential customers. Electronic messaging, and particularly electronic mail ("e-mail"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, junk e-mail is now or soon will become a major threat to trustworthy computing.

A key technique utilized to thwart junk e-mail is employment of filtering systems/methodologies. One proven filtering technique is based upon a machine learning approach—machine learning filters assign to an incoming message a probability that the message is junk. In this approach, features typically are extracted from two classes of example messages (e.g., junk and non-junk messages), and a learning filter is applied to discriminate probabilistically between the two classes. Since many message features are related to content (e.g., words and phrases in the subject and/or body of the message), such types of filters are commonly referred to as "content-based filters".

Some junk/spam filters are adaptive, which is important in that multilingual users and users who speak rare languages need a filter that can adapt to their specific needs. Furthermore, not all users agree on what is and is not, junk/spam. Accordingly, by employing a filter that can be trained implicitly (e.g., via observing user behavior) the respective filter can be tailored dynamically to meet a user's particular message identification needs.

One approach for filtering adaptation is to request a user(s) to label messages as junk and non-junk. Unfortunately, such manually intensive training techniques are undesirable to many users due to the complexity associated with such training let alone the amount of time required to properly effect such training. In addition, such manual training techniques are often flawed by individual users. For example, subscriptions to free mailing lists are often forgotten about by users and thus, are incorrectly labeled as junk mail. As a result, legitimate mail is blocked indefinitely from the user's mailbox. Another adaptive filter training approach is to employ implicit training cues. For example, if the user(s) replies to or forwards a message, the approach assumes the message to be non-junk. However, using only message cues of this sort introduces statistical biases into the training process, resulting in filters of lower respective accuracy.

Still another approach is to utilize all user(s) e-mail for training, where initial labels are assigned by an existing filter and the user(s) sometimes overrides those assignments with explicit cues (e.g., a "user-correction" method)—for example, selecting options such as "delete as junk" and "not junk"—and/or implicit cues. Although such an approach is better than the techniques discussed prior thereto, it is still deficient as compared to the subject invention described and claimed below.

In addition, current filter technology which is designed to fight against spam remains problematic. For instance, if a spammer can find one message that is able to get through a filter, they can get a million spam messages through before the filter is updated. Regardless of how fast filters can be updated, spammers can presumably send their messages faster and faster by simply acquiring greater bandwidth.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention provides for an intelligent quarantining system and method that facilitates classifying items in connection with spam prevention. More specifically, the invention classifies or flags messages as suspicious and/or temporarily delays their classification (as either spam or good). A delay or quarantine period can be set by the filter and/or by the system which provides a suitable amount of time to learn more information about the message(s) and/or about the sender.

According to one aspect of the invention, the information can be obtained from one or more system components that can be configured to monitor activities and/or behavior such as message volume (e.g., message volume per sender). For example, messages sent in low volume are less likely to be spam. Similarly, messages sent in high volume are more likely to be spam.

According to another aspect of the invention, message content can be analyzed to determine whether it substantially resembles a message found in a honeypot. Recall that a honeypot refers to a known spam target to identify incoming messages as spam and/or to track specific merchant message address processing. In general, a honeypot is an e-mail address where a set of legitimate messages can be determined and all other messages can be considered spam. For instance, the e-mail address can be disclosed on a website in a restrictive manner not likely to be found by people. Hence, any messages sent to this address can be considered spam. Alternatively, the e-mail address may have only been disclosed to a merchant from whom legitimate messages is expected to be received. Thus, messages received from the merchant are legitimate, but all other messages received can safely be considered spam. Spam data derived from honeypots and/or other sources (e.g., users) can be integrated into the feedback loop system, but because of the substantial increase in spam classification with honeypots, such data can be down weighted to mitigate obtaining biased feedback results.

According to another aspect of the invention, message content can be analyzed to determine whether it substantially resembles messages that have received feedback through other methods, including: being marked as 'this is junk' by a user; being marked as 'this is not junk' by a user; being categorized by a Feedback Loop user (see *Feedback Loop for Spam Prevention* noted supra); being categorized by a deployment of the Feedback Loop technology in some other setting (e.g., on Y Server instead of in J E-mail Service); by comparing it to other spam repositories.

According to still another aspect of the invention, quarantining can be combined with hash-based techniques. In one instance, messages can be hashed to assist in ascertaining whether quarantined messages are similar to any other messages (previously quarantined) which have been later classified as good or spam and move them out of quarantine. Spammers typically send mail to many thousands or millions of users. The messages are sometimes identical, nearly identical, or identifiable as being of one type. Thus, catching messages that are similar to one another can facilitate their classification. However, if no similar messages (or only very few) exist in honeypots, the feedback loop, or user complaints, then the message is probably targeted to a particular recipient or group of recipients, and therefore, the sender is most likely not a spammer.

Quarantined messages can be stored in a special folder identified as "Quarantine", "Junk", "Potential Junk", and the like that may be either visible or invisible to the user. Messages sent to the quarantine folder may be selected for the Feedback Loop, whether or not the quarantined messages are normally visible to the user. That is, just like messages that are deleted, put in the junk folder, or put in the inbox, messages sent to the quarantine folder may be selected for user classification. Recall, that the Feedback Loop is a polling mechanism that involves asking users to classify at least a subset of messages as spam or good to facilitate detecting spam and building more robust spam filters. As employed in the present invention, the Feedback Loop can be utilized to poll users on a random sampling of quarantined messages. For example, at least a subset of quarantined messages can be allowed through to their respective recipients (e.g., users) participating in the Feedback Loop for user classification.

As an alternative or in addition to the Feedback Loop, the quarantine folder can be visible to message recipients (e.g., at least a subset thereof) to provide them an opportunity to classify at least a subset of the messages held in the special folder. In this case, however, the recipients may or may not also be Feedback Loop participants. They may be able to report such messages as good or as junk. Such characterizations can be performed by clicking on one or more buttons such as a "junk reporting" button to indicate that the message is spam or a "good" or "rescue message" button to indicate that the message is legitimate. Thus, user data, either through the Feedback Loop or junk/good reporting methods, with respect to at least a limited selection of quarantined messages can facilitate determining whether a particular quarantined message is spam.

It should be appreciated that unlike rescue systems which classify uncertain messages as spam and then allow users to rescue them from deletion, the present invention delays classification (as spam or otherwise) and allows some users to provide their opinions about particular messages to facilitate subsequent classification. Moreover, user complaints such as those submitted by feedback loop participants and/or unsolicited message recipients can be utilized to facilitate determining whether at least some of the messages under quarantine are spam. The lack of complaints from users can also be noted and employed to assist in determining whether particular messages are spam.

As an alternative to quarantining messages, at least a subset of questionable or suspicious messages can be allowed to trickle out or pass through the filter without quarantining or explicit user classification (e.g., feedback requests, polling, and the like). Instead, user/recipient behavior with respect to these messages can be monitored or observed. The amount of messages permitted to trickle out can be a fixed number of messages per sender (e.g., first 1000) or a fixed percentage of messages—such as per sender. Recipients of these messages can then be afforded an implicit opportunity to characterize the message(s) as being spam or not spam. User behavior with respect to these messages can be employed to update the filter(s)

In yet another aspect of the invention, machine learning systems (e.g., neural networks, Support Vector Machines (SVMs), Bayesian Belief Networks) facilitate creating improved and/or updated spam filters that are trained to recognize both legitimate and spam messages and further, to distinguish between them. Once a new or updated spam filter has been trained in accordance with the invention, it can be distributed to mail servers and client e-mail software programs. Furthermore, the new or updated spam filter can be trained with respect to classifications and/or other information provided by particular user(s) to improve performance of a personalized filter(s). As additional training data sets are built, the spam filter can undergo further training via machine learning to optimize its performance and accuracy. User feedback by way of message classification can also be utilized to generate lists for spam filters and parental controls, to test spam filter performance, and/or to identify spam origination.

Furthermore, training data as generated in part by users as well as system analyses can also be utilized to create new sub-filters (smaller than a full-size filter trained on a plurality of features for good, spam and suspicious messages) that are specifically applicable to recently quarantined messages. The new sub-filters can be trained on one or more particular features (a subset of features) extracted from the recently quarantined messages. For example, a sub-filter can be trained only on IP address features.

As soon as the information is obtained and/or when the quarantine period has elapsed, one or more (spam) filters can be updated to facilitate appropriate classification of the quarantined messages. Note that this does not imply that the filter must be updated every time a message is ready to come out of quarantine (although it can be where practical). This invention can instead select quarantine times to be in sync with pre-set filter updating schedules, so that batches of messages are ready to come out of quarantine immediately after a filter update occurs (and thus be classified or re-classified with the updated information). This scheduling can be done implicitly (e.g., a new filter is scheduled to arrive at 1 PM so messages are quarantined until 1:01 PM) or explicitly (e.g., messages quarantined 'until a new filter arrives', whenever that may be). Hence, these suspicious messages can be rerun through the updated filter(s) and classified as either spam or not spam. For example, a delayed message may be classified as "good" based in part on a lack of new negative information. Likewise, a delayed message can be classified as good based upon new positive information.

Moreover, information gathered from user and/or system feedback can be employed to update the one or more filters already in use. As a result, the delayed messages can be processed or sent through the filter(s) again for classification. In addition, new filters can be trained for application to subsequent incoming messages subjected to quarantine.

When messages are determined to be spam during the quarantine or delay period, they can be deleted directly from the special folder (e.g., quarantine folder) and/or moved to another folder (e.g., trash folder) for discard. Otherwise, messages classified as good can be time-stamped with their respective release dates (date of release from quarantine) and delivered to their intended recipients. Thus, these messages may have two time stamps—a first indicating the original arrival date and a second indicating the release from quarantine. The release from quarantine date may be the Date: header field, thus ensuring that client software sorts these messages appropriately, where they will be seen. (In particular, if a message is substantially delayed, and then appears in its usual order, it may appear in a section of a date-sorted inbox where the user is unlikely to see it. Stamping a new date helps ensure that the message will be visible to the user.)

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
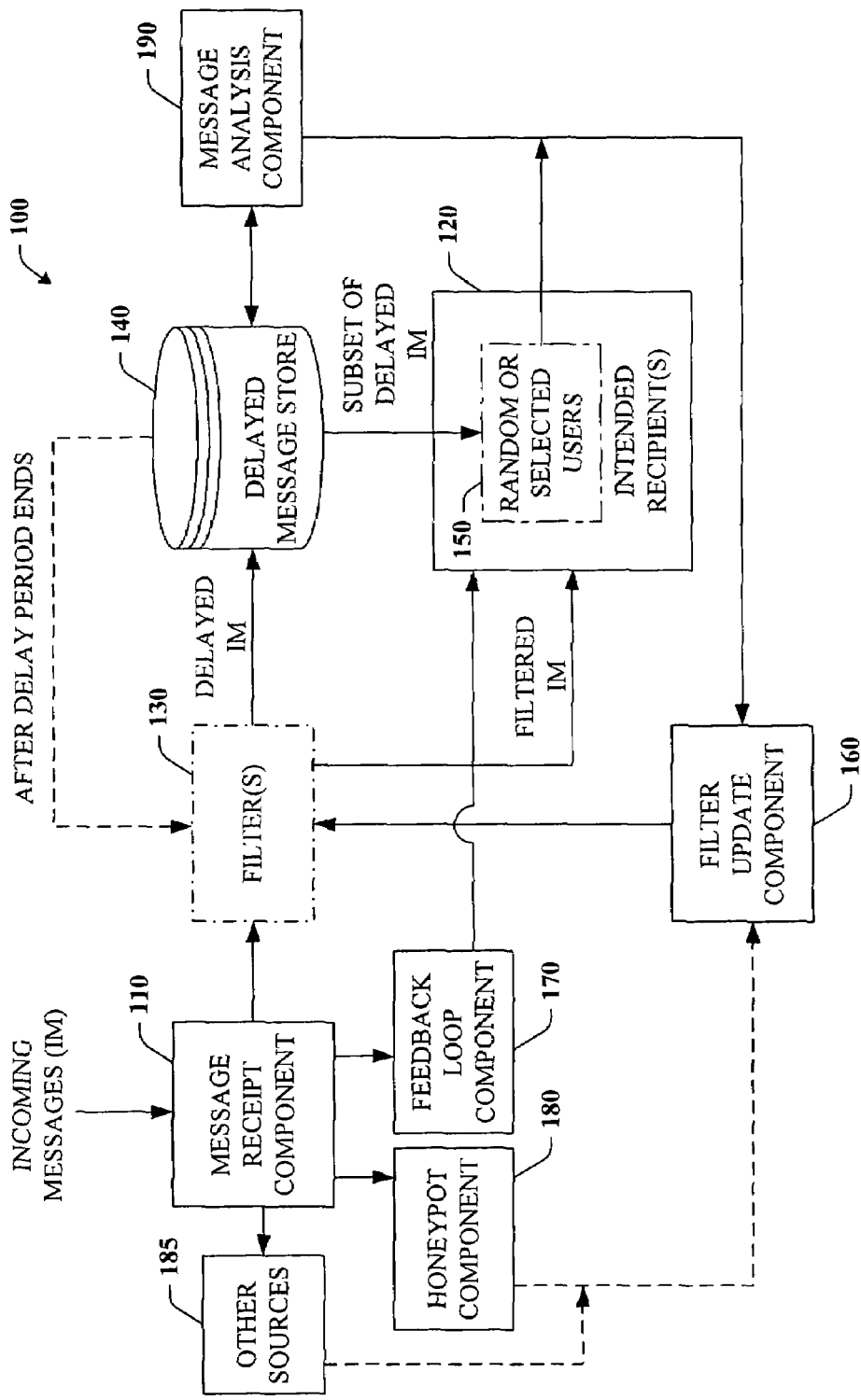
FIG. 1 is a block diagram of an intelligent quarantining system that utilizes feedback in connection with a feedback loop training system to learn more about quarantined messages in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference or conversation between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above. In this particular application, a filter can be trained to automatically filter particular message content (text and images) in order to capture and tag as junk the undesirable content (e.g., commercials, promotions, or advertisements).

In the subject invention, the term "recipient" refers to an addressee of an incoming message. The term "user" refers to a recipient who has chosen, either passively or actively, or has been indirectly selected to participate in the feedback loop systems and processes as described herein.

The present invention involves systems and methods that facilitate intelligent quarantining of incoming items or messages. Intelligent quarantining refers to holding back some messages that are suspected as being spam. This can give more time for a filter to update and arrive at a more accurate classification for these messages. In practice, consider the following scenario without quarantining: A spammer finds a message that gets through the current filter. He sends it to 10,000,000 people as fast as he can, before a message system can obtain a filter update. The 10,000,000 people receive spam (in their inboxes). Now consider the same scenario with quarantining: A spammer finds a message not currently caught or classified as spam; however the message is odd in some way, making it suspicious to the system. He sends this message to 10,000,000 people as fast as he can before the filter can be updated. Since the spammer's messages are suspicious and not enough information is available for the filter to readily classify it as spam or not spam, they can be quarantined as described in the present invention below.

Referring now to FIG. 1, there is illustrated a general block diagram of a quarantining system 100 that implements a feedback loop system in accordance with an aspect of the present invention. A message receipt component 110 receives and delivers incoming messages (denoted as IM) to intended recipients 120. The message receipt component can include or can operate together with at least one filter 130 (e.g., first classification component), as is customary with many message receipt components to mitigate delivery of undesirable messages (e.g., spam). The message receipt component 110 in connection with the filter 130 processes the messages (IM) and provides a filtered subset of the messages (denoted as FILTERED IM) to the intended recipients 120.

It should be appreciated that the filter(s) 130 may have been trained using a feedback loop system. In particular, the filter(s) 130 are previously trained to identify not only spam, but also to distinguish between spam and good mail based at least in part upon trusted user feedback. Machine learning systems facilitate the training of such filters 130 by utilizing training data comprising user feedback regarding both good and spam messages.

When the one or more filters 130 have enough information about an incoming message, the filters 130 can more accurately score the message and classify it as either spam or not spam (e.g., good). Thus, for the subset of messages (FILTERED IM) that are delivered to their intended recipients 120, it can be concluded that the filters 130 comprise a sufficient amount of information to determine that the messages were good. Likewise, another subset of incoming messages can be identified as spam and appropriately discarded (not shown).

Unfortunately, spammers, and even legitimate senders to a lesser extent, tend to change some portion of their sender information more frequently than others. For example, spammers have a greater tendency to disguise or modify many aspects of their messages such as their IP address, domain name, and message content in an attempt to fool or get by spam filters. Conversely, some legitimate senders change their IP address for logistical reasons. For instance, The New York Times is known to change their IP address from time to time due to the addition of new servers that are needed to accommodate increased numbers of online subscribers. Due to these types of changes in at least a subset of incoming messages, the filters 130 may not have enough information about the messages to accurately determine a spam probability score (e.g., probability that message is spam). As a result, the messages cannot be accurately classified due to a lack of information.

Unlike conventional spam prevention systems, messages that lack information for classification can be held back or quarantined (flagged for further analysis) in the present invention—while more information is collected about them. The quarantined messages can be moved to a delayed message store 140 for a period of time (e.g., delay or quarantine period) until the filters 130 can be updated with any information collected during the quarantine period. The delayed message store may be the same as some other store, e.g., the junk folder, or queues on a server. Quarantined messages in this store may be specially marked, or all messages in this folder or queue may be periodically rescored as if they were quarantined.

There are several types of information that can be obtained. One type is a trickle out component. User feedback on quarantined messages may involve employing a trickle out mechanism in which at least a subset of quarantined messages is allowed to "trickle out" out of quarantine or bypass the filter classification process for delivery to their intended recipients. Messages which are trickled out may be selected based in part on the fact that the intended recipient (e.g., random or selected user 150) is a participant in the feedback loop system for training spam filters. Alternatively or in addition, the trickled out messages can be randomly selected.

Another form of data is the Feedback Loop. The Feedback Loop component 170 selects a portion of the mail, whether quarantined, deleted, etc. for further feedback from users (e.g., recipients participating in the Feedback Loop). The Feedback Loop component 170 gives data to a filter update component 160 that facilitates building and/or updating filters. As described in Feedback Loop for Spam Prevention, cited supra, users can be explicitly queried about these messages.

Yet another form of data can come from honeypots 180 (e.g., honeypot component). When messages arrive at the message receipt component 110, some messages may flow into the honeypot component 180. In general, messages found in honeypots may typically be spam. Thus, information identifying these messages can be gathered for later use by the filter update component 160 when updating or building filters.

Data can also come from other sources 185 including 'this is junk', 'this is not junk', or from Feedback Loop technology deployed in new settings, or from other sources.

User feedback can be collected by the filter update component 160 and then employed to update the filter(s) 130. It should be appreciated that the quarantine period can have a set duration. For example, it can be automatically or manually set for any length of time such as 1 hour, 6 hours, or 24 hours. This means that information can be collected for 1 hour, 6 hours, or up to 24 or more hours after the message was moved to the delayed message store 140. In some cases, a lack of user complaints to the trickled out messages can indicate that the messages (e.g., either multiple copies of the same message or many different messages per sender) are more likely to be legitimate and less likely to be spam.

In addition to user feedback, information can also be gathered by a message analysis component 190 that is operatively connected to the delayed message store 140. The message analysis component 190 can monitor quarantined messages with respect to volume per sender and similarities among quarantined messages and can analyze them as well for their content and/or origination information. For instance, messages sent in low volume (e.g., less than 20 per hour, less than 50 per hour, less than 1,000 per hour, etc.) are less likely to be spam than messages sent in high volume (e.g., 10,000 per hour, 100,000 per hour, etc.), which is more representative of spammer behavior. Thus, information that a particular sender is sending a low volume of messages can be a feature learned about the sender and used to update the filters 130 so that in the future, the sender's messages may not deemed to be suspicious, but rather may be classified as good.

Additionally, a hash function can be computed with respect to at least a subset of quarantined messages to determine similarity among the messages such as per sender. For instance, messages in quarantine can be compared to other recent messages based on content or based on sender. If other recent messages with the same or a similar hash or from the same or a similar user were reported as junk by users, classified as junk in the feedback loop, or arrived in honeypots, the message can be classified as spam. If similar messages were marked as good, or rescued from a quarantine or junk folder, or classified as good in the feedback loop, the message can be classified as good. If many similar messages reached the message receipt component, then the volume of such messages can be an indicator that the messages are spam. If many similar messages were delivered to users inboxes (e.g. through trickle out), and none or few were marked as junk by users, this can be taken as an indicator that the messages were good. If no similar messages arrived in honeypots, this can be taken as an indicator that the message is good.

When the quarantine period has ended, the filters 130 can be updated accordingly (e.g., an updated filter can be denoted as a second classification component) and the quarantined messages can be re-filtered for classification as either spam or good. Filter updates based at least in part by training data generated from feedback on quarantined messages can occur frequently as determined by the user (e.g., for a personal filter), client and/or server. Filter updates can also be set to coincide with the length of quarantine periods and vice versa.

Figure 2:
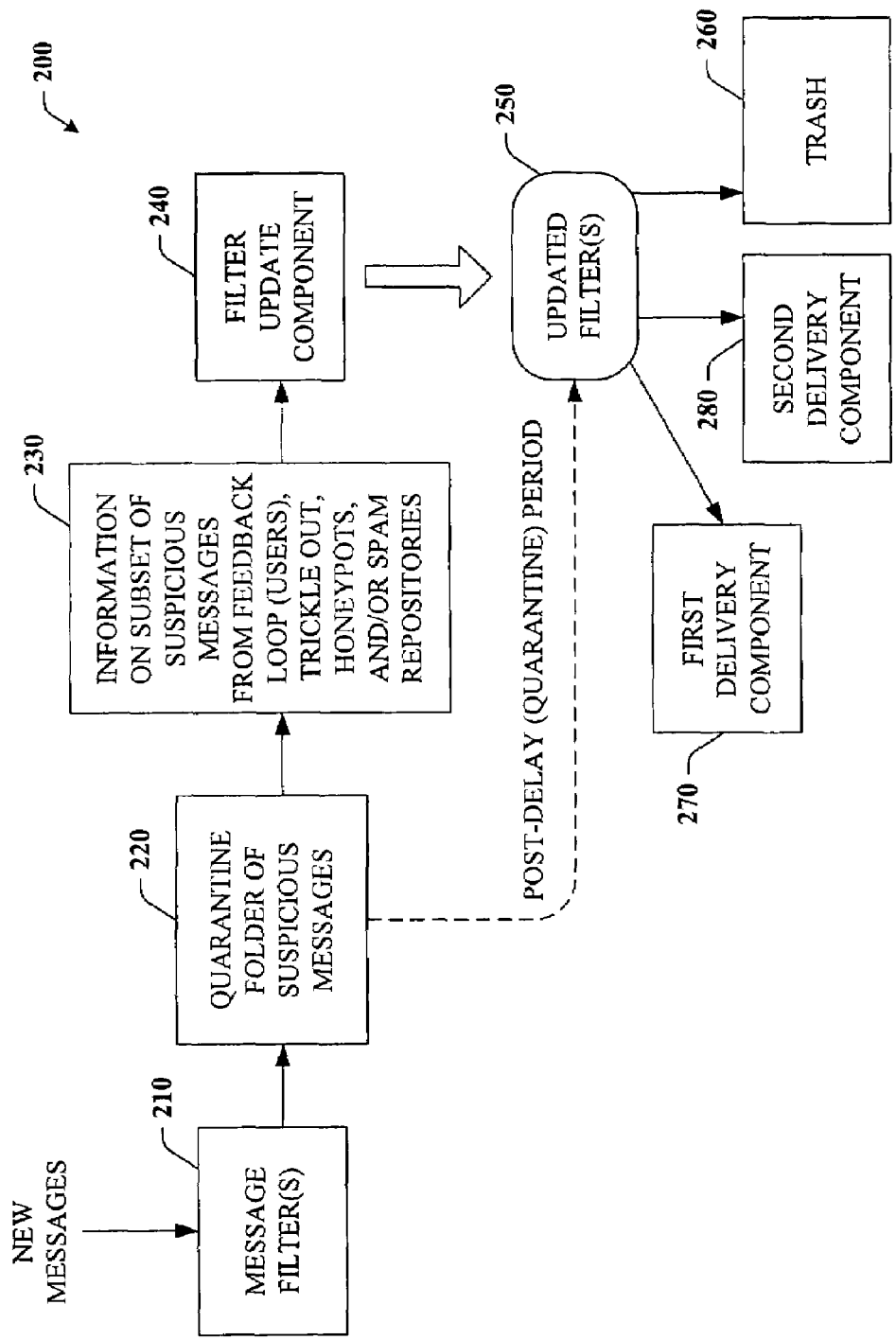
FIG. 2 is a block diagram of an intelligent quarantining system that facilitates obtaining more information about suspicious messages to update spam filters and to classify suspicious messages as spam or not spam in accordance with an aspect of the present invention.

Turning now to FIG. 2, there is illustrated a block diagram of a quarantining system 200 that facilitates message classification. The system 200 comprises one or more message filters 210 through which new messages are processed for classification as being spam or good. Messages that do not definitively qualify under either spam or good such as by a threshold analysis can be viewed as suspicious and moved to a special quarantine folder 220 until further data about the message or message sender can be provided to the filter(s) 210. This is in direct contrast to message rescuing systems. Unlike the present invention, systems that perform message rescue classify uncertain messages as spam and move them to a spam folder. Such "spam" messages are rescued later because someone classifies a very similar message as good. In the present invention, messages can be deemed "suspicious" and classification as spam or good is temporarily delayed in order to provide time to learn more about them.

One learning technique that can be employed involves receiving additional data 230 about the suspicious messages. In some circumstances, some suspicious messages can be released (trickled out) to their intended recipients. Alternatively, the Feedback Loop may be used to sample some message. Alternatively, some data may be delivered to honeypots. Alternatively, data may come from 'this is junk' reporting; from 'this is not junk' reporting; or from Feedback Loop technology deployed in new settings; or from other sources.

In other circumstances, users may have access to their quarantine message folders. When this occurs, users can provide feedback on at least a subset of the quarantined messages. Similar messages can then be given similar treatment making it so that users do not need to offer feedback on all quarantined messages. This can be relatively important since several thousand messages can be quarantined, whereby their classification as spam or good has been temporarily delayed.

The feedback can be in the form of positive or negative comments from users who had some access to the particular messages. For example, positive comments can comprise affirmation "statements" that a message is good. Additionally, positive comments can comprise a lack of new negative comments and/or a lack of new complaints on similar information.

System feedback on the quarantined messages can also be collected. This can include data collected from monitoring at least a subset of messages in the quarantine folder 220 for characteristics such as volume (low or high volume of message), similarity of message to other quarantined messages, and/or similarity of message to honeypot message. This information together with any available user feedback can be utilized by a filter update component 240 as respective features (or training data) to train and update the filter(s) 210. Following therefrom, updated filters 250 can be generated. The quarantined messages can be, in substantial part, run through the updated filters 250 to resume the classification process. Hence, once classified, designated spam can be permanently deleted from the quarantine folder or sent to a trash bin 260 for deletion. A first delivery component 270 can release the "good" messages from quarantine for delivery to their intended recipients. If the quarantine folder is not also the junk folder, quarantined messages can be placed in the junk folder by way of a second delivery component 280. If the quarantine folder is the junk folder, quarantined messages may have a special "quarantined" flag removed.

Figure 3:
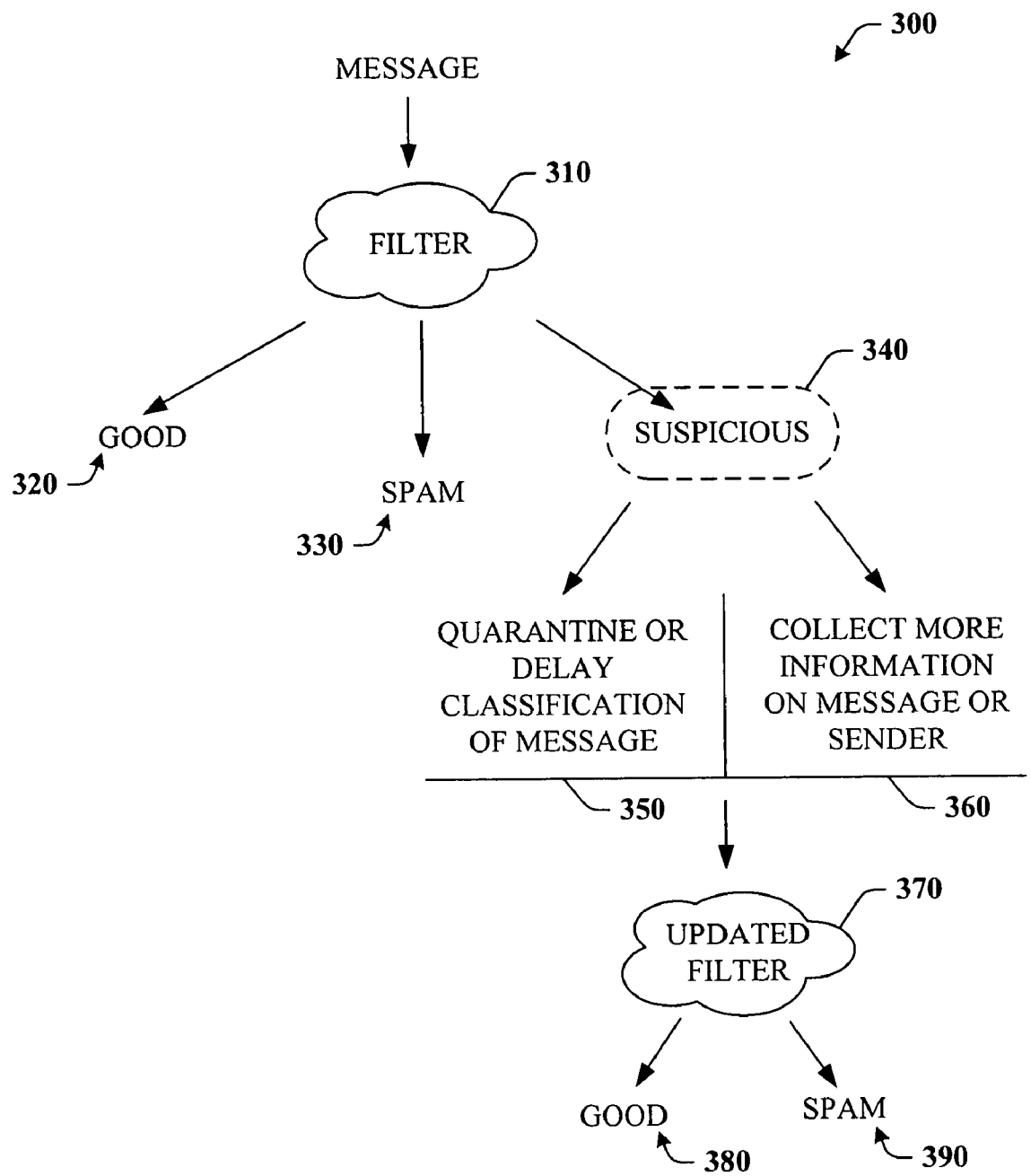
FIG. 3 is a schematic flow diagram of exemplary classifications of incoming messages in part by established filters and in part by updated filters in accordance with an aspect of the present invention.

FIG. 3 demonstrates another view of the advantages associated with a quarantining system 300 according to an aspect of the invention. In particular, the view schematically illustrates one particular course a new incoming message may take. The message is initially processed through a filter 310. The filter has been trained to distinguish between good 320 and spam 330 messages by computing probability scores, for example. However, some messages may fall on the edge of being decisively classified as spam or good. These can be suspicious messages 340. One reason for this is that the filter may lack information about the message merely because the message includes aspects or features it has not seen before or does not recognize. For these particular messages, classification as spam 330 or good 320 is deferred for a time period (350). This time period allows the filter to learn more information (360) about the message before committing to a spam or good classification. As a result, classification error rates can be reduced and user satisfaction can be increased since never-seen-before "good" messages are not arbitrarily classified as "spam" simply due to an ignorant filter or a filter lacking the appropriate information.

The filter can be updated (370) and classification of the message being either good 380 or spam 390 can resume. It should be appreciated that the time period should be long enough so that more data can be and is obtained to facilitate classification of the quarantined message as either good or spam. In other words, a "suspicious" label may no longer be available or applicable to the quarantined messages once the quarantine time period has elapsed.

Figure 4:
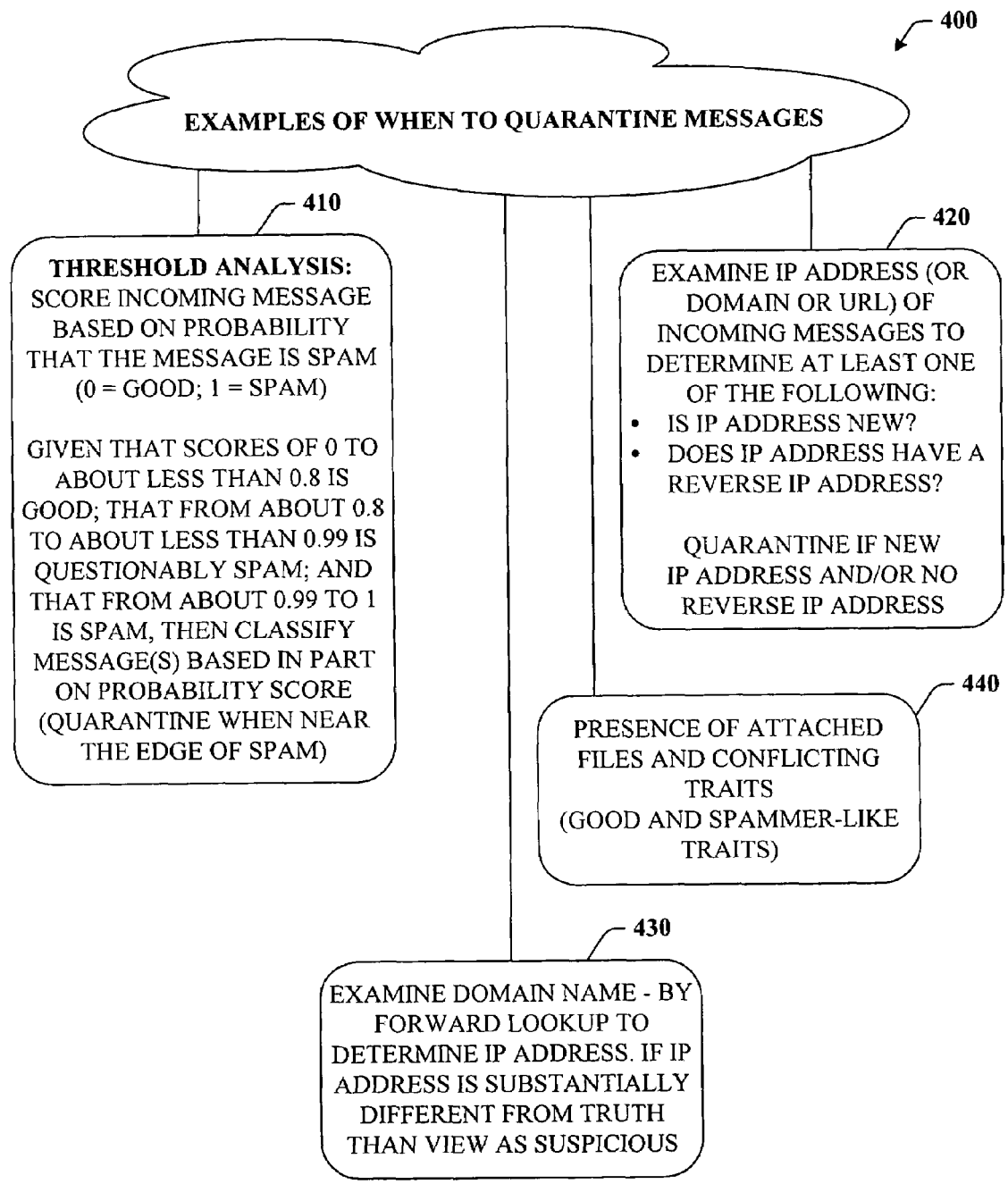
FIG. 4 is a schematic diagram of exemplary instances that facilitate determining appropriate occasions to deem messages as suspicious for quarantine purposes in accordance with an aspect of the present invention.

Referring now to FIG. 4, there is a schematic illustration 400 of exemplary instances that can result in the temporary delay of classification and quarantine of messages. When messages initially arrive at a message receipt component (e.g., FIG. 1, 110), they can be evaluated by one or more filters and then scored. The probability score refers to the likelihood that a particular message is spam. This score can be compared to a threshold such as a delete threshold and a move threshold.

Messages that meet or exceed the delete threshold can be considered to be spam or at least more spammer-like. Given that a perfect probability score of 0=good messages and a perfect score of 1=spam or junk messages, it can be determined that calculated scores between 0 and up to about 0.8 reflect good messages (or messages too likely to be good to risk putting in the junk folder) (thus, get delivered), scores between about 0.8 and up to about 0.99 reflect probable junk (thus, can be placed in a junk folder), and scores between from about 0.99 to 1 reflect junk or spam (thus, can be deleted with a great amount of certainty). Messages with scores on or near the edge of either spam or good or a threshold for which some configurable action is defined can be selected for quarantine. Otherwise, some other configurable action can occur such as marking the message in some special way or sending to a message administrator to investigate the message.

For some messages that would be deemed questionable perhaps because of a new IP address not seen before by the filter, quarantining may or may not be helpful. That is, some messages may be near the edge but their score may not change much to lead to a definitive classification as spam or good even after more information is learned about them. For example, consider messages from fictional senders Large Good Newspaper Corp and Mostly Evil Spammer Inc. Messages from Large Good Newspaper Corp are assigned a 25% likelihood (threshold) of being spam whereas messages from Mostly Evil Spammer Inc. are assigned an 80% likelihood. These percentages are based on large amounts of information or training data previously obtained and used to train the filters (by machine-learning techniques). The Large Good Newspaper Corp apparently does not debounce their lists and so approximately one quarter of filter users mark this message as spam (e.g., some users forget they subscribed and mark it as spam). Thus, the filter gives their messages about a 25% probability of being spam which is low enough to get through filters but potentially high enough to be quarantined. However, these messages are consistently at the 25% level; and there is no need to give every recipient their Large Good Newspaper Corp headlines a day or more late as the filter waits to see if more information is obtained or to see if tomorrow the score for those messages has changed. Similarly, messages from Mostly Evil Spammer Inc. are consistently 80% spam from day to day. Thus, in either of these situations, quarantining may not be the optimal or most efficient approach to take since additional information is less likely to change either classification.

Therefore, if a relatively large amount of data is already known about a message, then a user or filter system can decide not to quarantine since additional information is unlikely to effect a change of classification. A large of amount data can refer to any data relating to the IP address, links in the message, sender's domain name (particularly when combined with anti-spoofing mechanism), words in the message, and any other features. Thus, for features that are being examined, it can be determined whether the filter already has a lot of information for those features per sender to facilitate making a decision to quarantine or not.

However, the distance to a threshold is not the only answer to determine when to quarantine. More specifically, consider the IP address of a message. When the IP address is previously unseen, it typically can be quarantined—unless the message is obviously spam or good based on other features of the message. If a message having an IP address that has not been seen before is received, there are three possibilities:

it is a low volume IP address (e.g., perhaps the server for a small business or an individual and it is not spam—or at the least, it is very targeted spam);

it is a new IP address perhaps for a large legitimate company as they add more servers (e.g., The New York Times)—again not spam; or it is a spammer's IP address.

By waiting even a few hours, the filter can probably distinguish between these three possibilities and obtain very valuable information. For an unknown IP address, it may be desirable to delay the message (quarantine temporarily) even if the message falls in a pretty wide range. The sender's domain can be handled in a similar manner. As anti-spoofing technology becomes more prevalent, messages can be quarantined as well to ascertain true sender's of certain questionable messages. In addition, if there is no reverse IP address entry for the sender's IP address and/or a forward lookup on the sender's domain does not at least approximately match the sender's IP address, the message can be quarantined (430).

Another substantial indicator of spam is the presence of embedded domains, especially in the links. If a message contains a domain name that is never or rarely seen before, it can be deemed suspicious. Just as with IP addresses, delaying delivery of such messages can be helpful to properly classify them as spam or good. Certain types of attached files (440) are particularly suspicious (e.g., typical of viruses) and messages containing such extensions (e.g., executable files or document files with embedded macros) can be quarantined.

Quarantining may also be able to detect attempts to use holes in keyword-based filtering. For instance, if a spammer discovers many good words and adds these good words to his message, but a few bad words are still detectable, the message can be viewed as suspicious (even though it has a good overall score). The message can be held back from classification for a few hours, for example, and through the feedback loop system, many messages of this kind can be discovered. After which, the filter can learn that the message of this type is actually bad. To combat this type of spammer tactic, words that are previously thought to be good can be downweighted and the filter can learn that the origin of the message is bad, etc. In other words, when a message appears to be of a type that is difficult for a machine learning filter because it includes conflicting evidence, it can be quarantined. Additionally, any message that appears to be difficult for any kind of filter because it includes HTML which can be difficult to parse or includes primarily an image can be quarantined. Overall, an assessment of a plurality of features can be performed before it can be determined whether to quarantine a message.

In general, individual users tend to receive messages from a relatively small number of locations and in a small number of languages. With respect to personal filters, when a user receives a message from a location they do not typically receive good messages from or in a language they do not typically receive good messages in, the message can be quarantined as well. The location can be determined based in part on geographic location, IP address, IP address allocation information, country code in FROM domain name, and the like.

Figure 5:
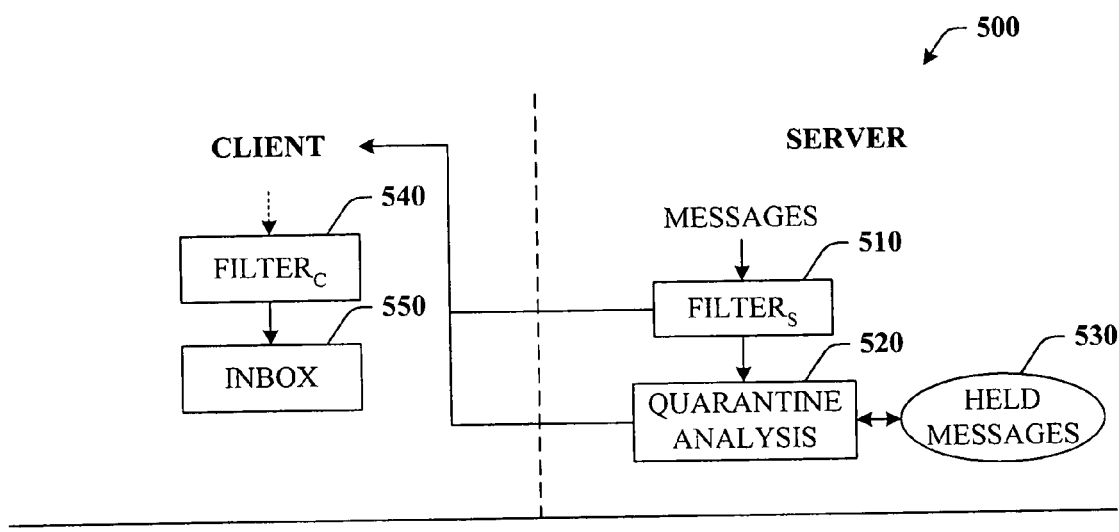
FIG. 5 is a schematic illustration of client and server communications in connection with implementation of a quarantine system on at least a server in accordance with an aspect of the present invention.

Turning now to FIG. 5, there is illustrated an exemplary high-level communication architecture 500 between at least one server and at least one client where quarantining is employed on at least the server in accordance with the present invention. In some cases, it may be desirable to indicate in some way that messages have already been quarantined. For example, if both clients and servers implement quarantining, it may not be desirable for clients to quarantine messages that have already been quarantined at the server. Alternatively, the client can reduce the quarantining time appropriately by subtracting the amount of the time the message was quarantined at the server from the amount of time it would quarantine it.

As shown in the figure, messages coming into the server pass through one or more FILTER$_S$(S) 510 and then either on to the client or to quarantine where they are held 530 for analysis and investigation 520. Messages from the server that have been quarantined (and have been released from quarantine) or that were not quarantined can then be passed to the one or more FILTERc(s) 540 located on the client. At this point, the messages can simply be classified by the filter 540 and then delivered to the inbox 550 as is appropriate.

Figure 6:
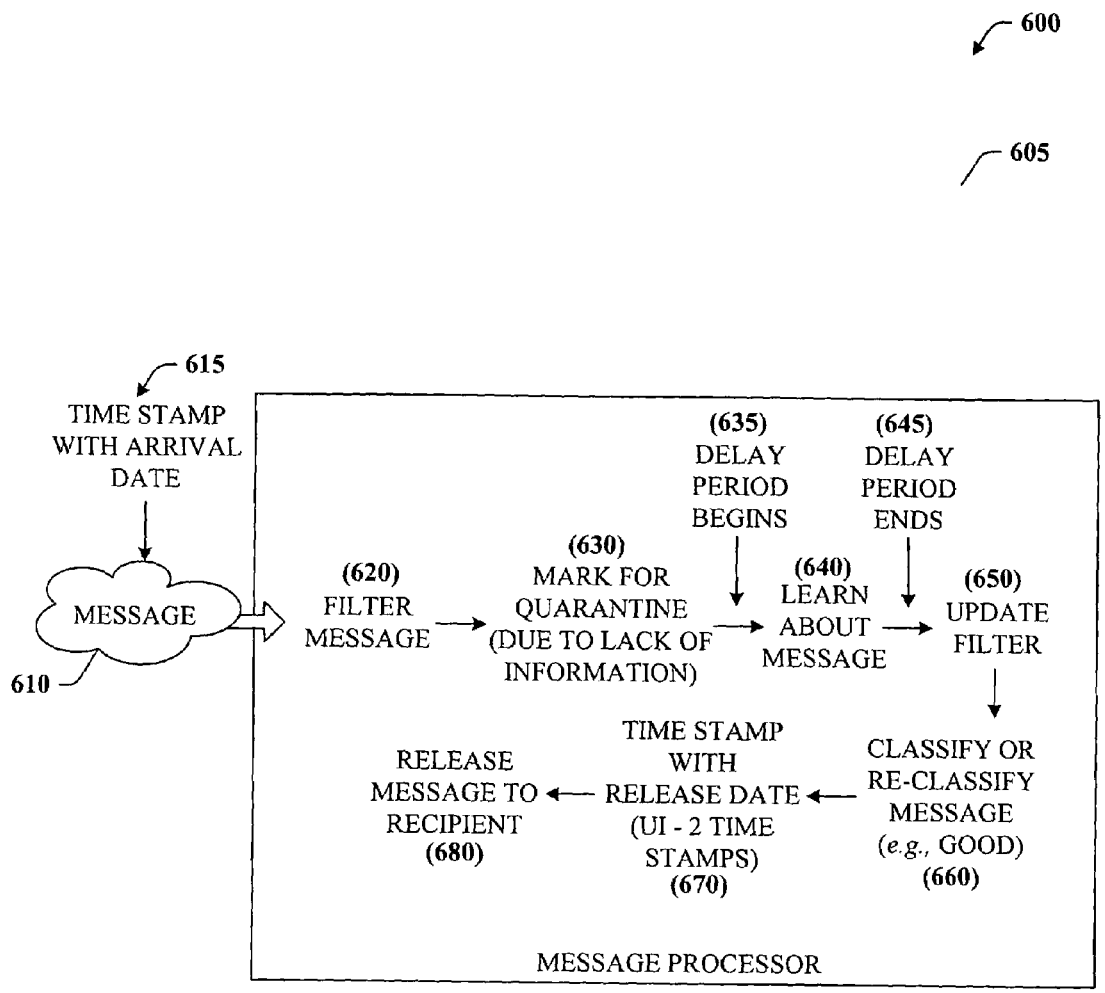
FIG. 6 is a block diagram of a message that proceeds through an exemplary quarantine process in accordance with an aspect of the present invention.

Referring now to FIG. 6, there is illustrated a schematic view of a quarantine system 600 involving the operation of a message processor 605 with respect to an incoming message 610. The message 610 is time stamped (615) with the date and time of its arrival and then enters the message processor 605 where it is filtered (620). The message is marked for quarantine due to a lack of information about the message (630). As a result of the quarantine, classification of the message as spam or good is delayed for the duration of a delay period.

The delay period (635) begins when the message is marked for quarantine and can continue for any amount of time set by the system or user. For example, the filter can provide a recommended quarantine time based in part on the next filter update (scheduled update). Since quarantining can be implemented by way of an API (application program interface), it is also possible to have m (e.g., an integer greater than or equal to 1) quarantine times (aggressive, moderate, conservative) passed into the appropriate API. Further discussion regarding the API is discussed infra in FIG. 10.

During the delay period, the filter can learn more about the message such as by collecting feedback from users as well as observations made from monitoring or analyzing the messages held in quarantine (640). When the delay period ends (645), the filter can be updated (650), and the quarantined messages can be classified as good or spam (660). For quarantined messages now classified as good, their original time stamp of receipt by the server, for example, may be hours or days earlier than their release date and/or delivery date. This can be problematic for users who sort their messages by incoming/arrival date. Thus, "good" messages released from quarantine can be time stamped with their release date as well (670) particularly when quarantine periods last for more than a few hours and extend out one or more days. Such messages can include both dates and/or can be sorted primarily by their release date, for example.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 7:
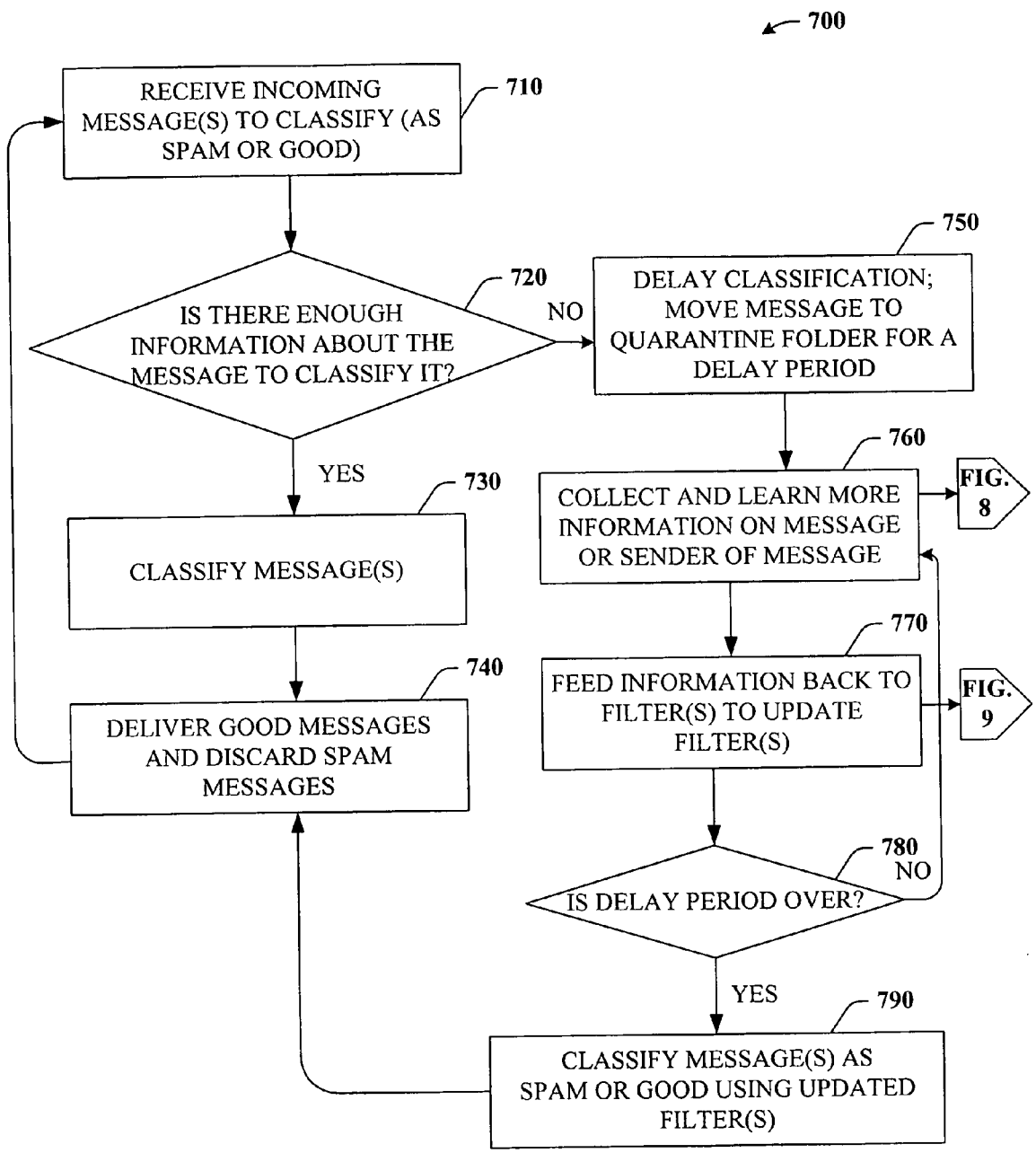
FIG. 7 is a flow diagram of an exemplary method that facilitates classifying messages when enough information is available and quarantining messages which lack enough information for classification in accordance with an aspect of the present invention.

Referring to FIG. 7, there is illustrated a flow diagram of an exemplary process 700 that facilitates delaying classification of suspicious or questionable messages. The process 700 involves receiving incoming messages for classification as spam or good at 710. At 720, it can be determined whether a filter has enough information to classify the message as spam or good. If yes, then the messages can be classified at 730 and following, good messages can be delivered and spam messages can be discarded at 740. This process can resume at 710 as incoming messages continue to be received. It should be appreciated that messages from senders on safe-lists are not quarantined though they may otherwise appear suspicious. Users can add senders to their respective safelists if they notice that particular messages are consistently under quarantine (per sender).

Figures 8, 9:
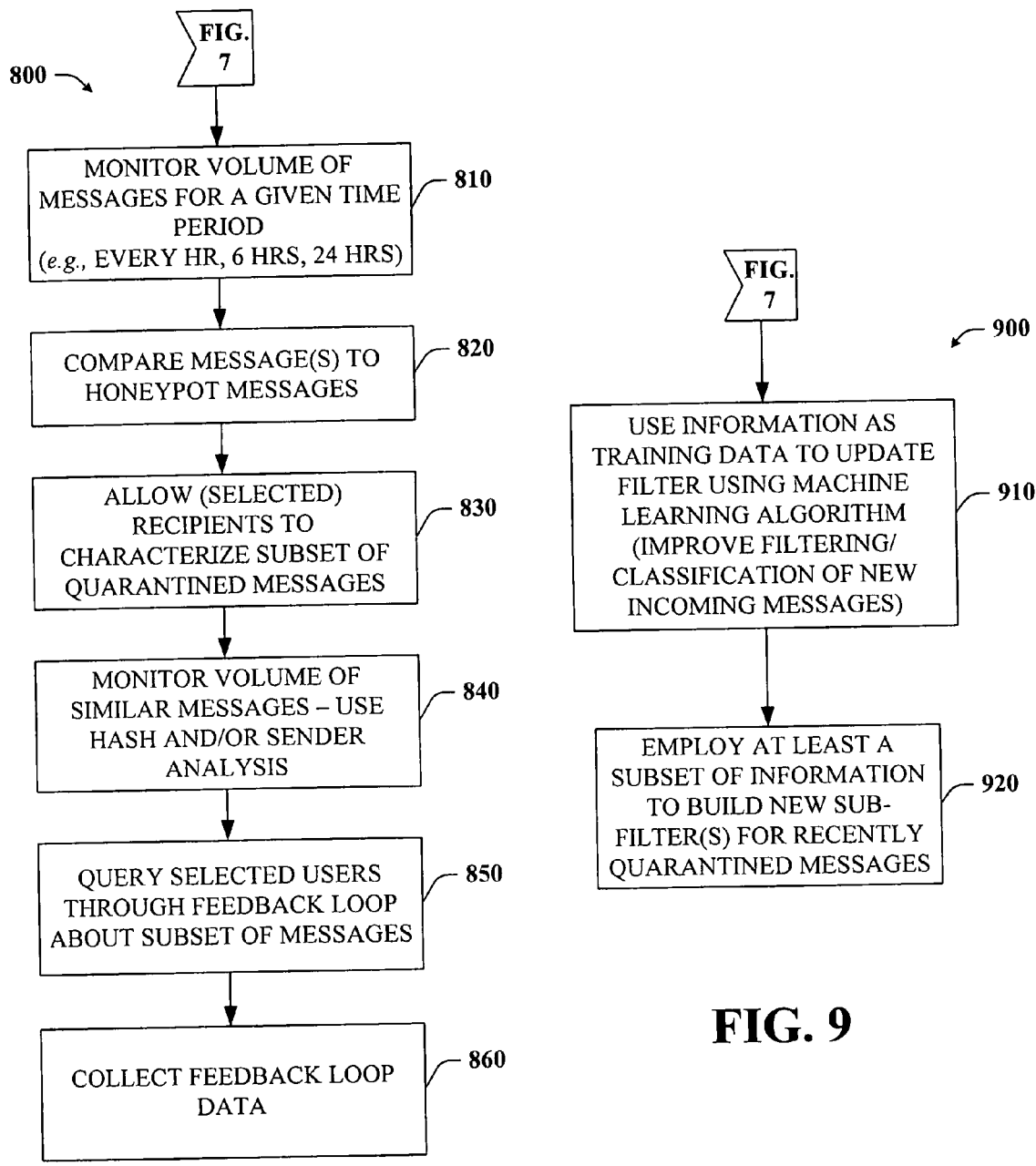
FIG. 8 is a flow diagram of an exemplary method that facilitates collecting more information about a message or message sender during a period of quarantine in accordance with an aspect of the present invention.
FIG. 9 is a flow diagram of an exemplary method that facilitates collecting more information about a message or message sender during a period of quarantine in accordance with an aspect of the present invention.

However, if there is a lack of information at 720, then the classification is delayed at 750, and the message can be moved to a quarantine folder or other type of special folder for the duration of a delay period. During this delay period, more information about the message or the sender of the message can be collected at 760. Further details regarding this stage of the process can be found in FIG. 8, infra. Any information or data collected can be fed back to the filter(s) to update the filter (by way of machine learning techniques) at 770. FIG. 9, infra, discusses additional details regarding this phase of the process.

Collection of data about the message continues until the delay period ends (780). When the delay period ends, the messages (or at least a subset) can be classified as spam or good using the updated filters at 790. Spam messages can be discarded and good messages can be delivered at 740.

Referring now to FIG. 8, there is illustrated a flow diagram of exemplary types of information that can be collected such as at 760 in FIG. 7, supra. For example, at 810, message volume can be monitored to determine whether the sender is a low volume or high volume sender. In addition the rate at which messages are sent per sender can also be indicative of spammer-like behavior. For example, sending a few hundred e-mails an hour directly contrasts with sending a few thousand e-mails an hour.

At 820, quarantined messages can also be compared to honeypot messages. Recall that honeypots are reliable sources of spam messages. Thus, quarantined messages that resemble honeypot messages may be more spam-like. This information can be quite useful to the filter when determining how to classify the message.

At 830, users can be afforded an opportunity to provide their input as to whether at least a subset of the quarantined messages is spam or not. In particular, a quarantine system can be designed so that a few messages either trickle out of quarantine or are allowed through the filter (bypassing quarantine) for the purpose of checking for user complaints. For instance, when messages from a new IP address are detected, the filter can be programmed to allow the first 1,000 or even 10,000 messages through the filter without quarantining. Alternatively, a fixed percentage of the messages can be let through. Later, messages from the same IP address are quarantined until a sufficient number of users have had time to examine the messages and complain if they are spam. After a sufficient amount of time has passed, a decision to classify as good or spam can be made.

At 850, quarantined messages can be analyzed for their similarity. In particular, hash values can be computed for the messages (or at least a subset) to determine which messages are similar to each other among different senders or per sender. High volumes of similar messages can indicate spam and this information can be used to update the filter. In addition, quarantined messages can be compared to recently quarantined messages that have been classified as spam or good. When similar messages are found, they can be removed from quarantine and classified as their earlier counterparts were. In addition, messages can be compared based on sender analysis (e.g., sender IP address).

At 860, feedback loop data is collected. As some messages come in, special queries are sent to the recipients specifically asking them to categorize the messages as good or spam.

FIG. 9 depicts a flow diagram of an exemplary process 900 outlining how information collected during a quarantine period can be utilized to improve classification of messages. At 910, the information can be employed as training data in conjunction with machine learning techniques to effectively update a spam filter, for example. By updating the spam filter, classification of messages as spam or good can be improved to mitigate false-good or false-spam classifications. Alternatively or in addition, at least a subset of the information obtained can be employed to build or train a new spam filter (sub-filter) for recently quarantined messages at 920.

Furthermore, a machine learning approach can be employed with respect to quarantining. In particular, the process (or associated system) can record for each message whether quarantining would have changed the classification of the message. If so, the message should have been quarantined, and if not, it would not have. Following, the process and/or system can learn based on this data, which messages should be quarantined. This machine learning approach can take into account any special features that may be useful for quarantining. Exemplary features include but are not limited to from a high volume IP address; the IP address of the message (if it's from Mostly Evil Spammer Inc. or Large Good Newspaper Corp, we know that the classification tends to be stable); from an unknown IP address or contains an unknown domain name; contains many good and bad features; etc.

Figure 10:
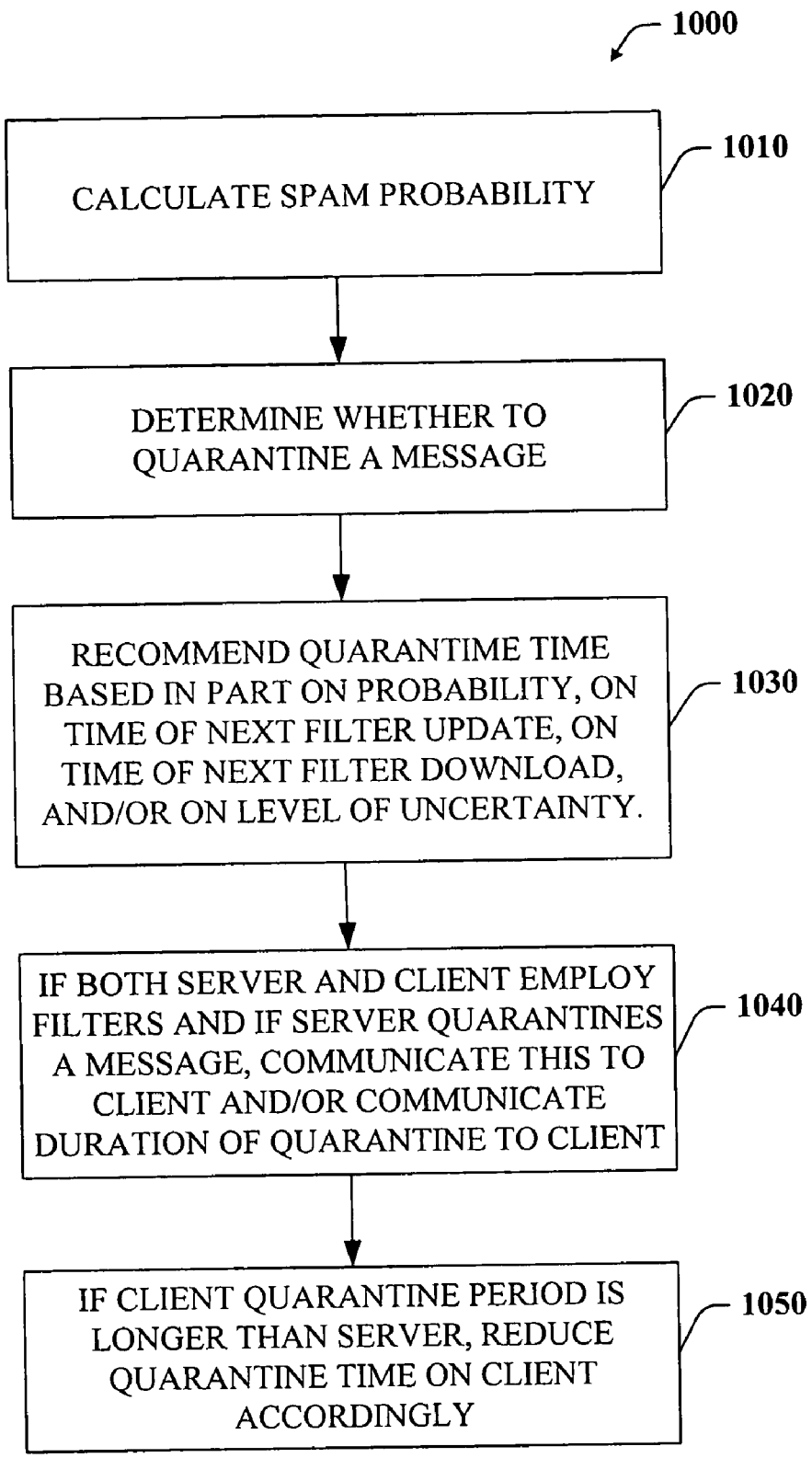
FIG. 10 is a flow diagram of an exemplary method that facilitates collecting more information about a message or message sender during a period of quarantine in accordance with an aspect of the present invention.

Referring now to FIG. 10, there is illustrated a flow diagram of an exemplary process 1000 that can be implemented at least in part in an API to carryout an aspect of the present invention. The process 1000 involves calculating a spam probability at 1010 for each incoming message. At 1020, a filter can determine whether to quarantine a particular message based at least in part on the respective calculated spam probability (score). At 1030, a quarantine time can be recommended based at least in part upon at least one of the following:

probability (score) that the message is spam;
 time of next filter update, time of next filter download (at which time the filter can decide whether to continue quarantining or make a final decision and repeat until a final decision is made); and/or
 level of uncertainty.

Alternatively or in addition, m quarantine times (aggressive, moderate, and/or conservative) can be passed into the API. The recommendation as to whether to quarantine, and how long, can be informed by the values passed into the API. The (spam) filter can return information regarding whether a message is spam as well as whether the message should be quarantined—and including how long to quarantine the message. Initially, the recommended quarantine time could simply be based on the spam probability but other factors can be considered as well such as those discussed above.

Both a server and client can implement quarantining with respect to their filters. Thus, if both server and client employ such filters and the server quarantines a message, this information can be communicated to the client filter at 1040. In addition, if the client filter quarantines as well, then the length of quarantine time on the server can be communicated to the client filter, whereby the client quarantine time can be reduced or not invoked or applied to the particular message by the server quarantine time at 1050.

Moreover, the temporary delay of message classification by a filter or spam filter, in particular, leads to a more robust filtering mechanism that facilitates spam prevention. In addition, unnecessary delays in delivery of good messages mitigate user dissatisfaction since not all questionable messages are subjected to quarantining. Rather, several factors and/or techniques can be employed as discussed hereinabove by the filter or filtering system to effectuate an intelligent quarantining system.

Figure 11:
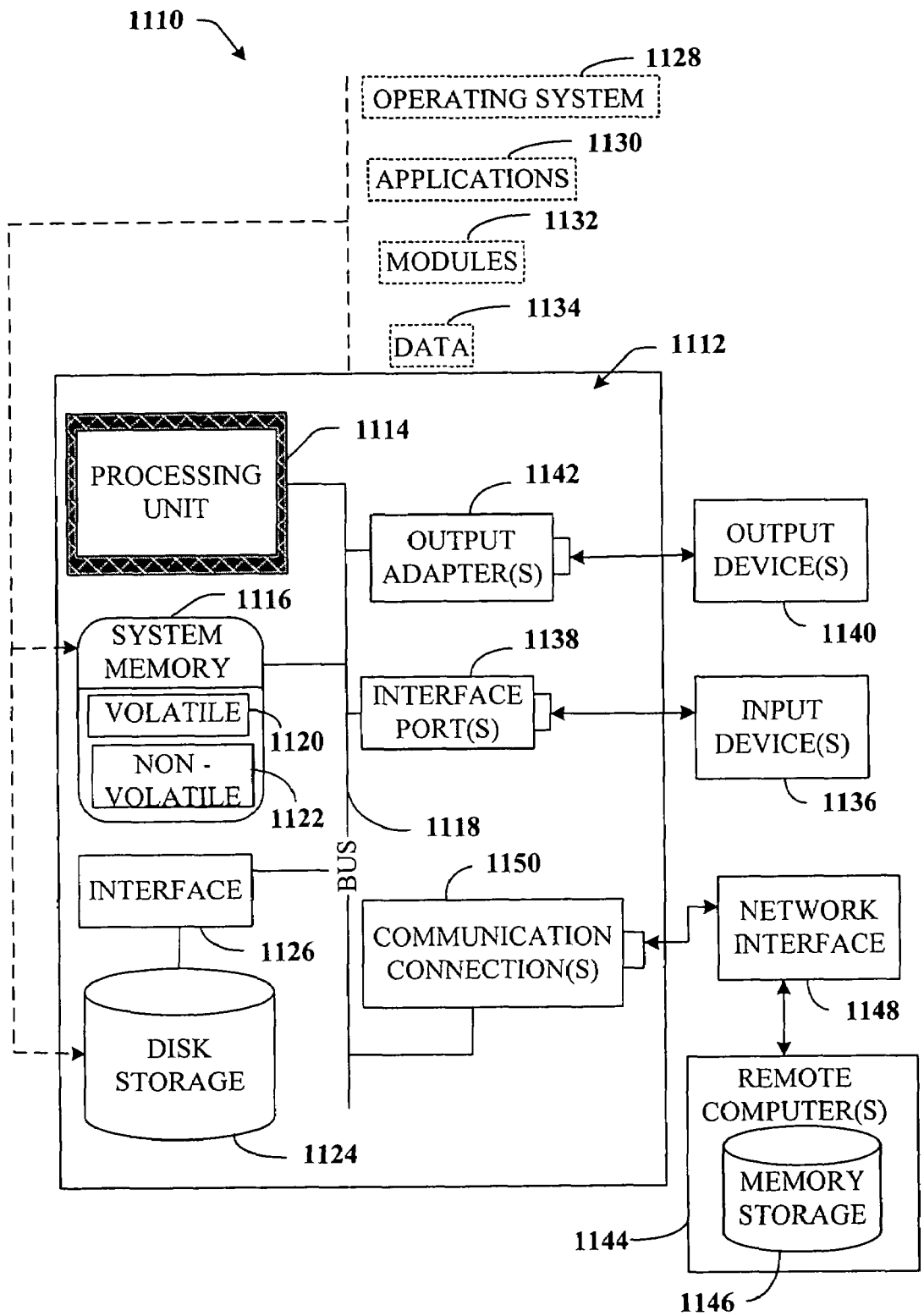
FIG. 11 is a schematic block diagram of an exemplary communication environment in accordance with the present invention.

In order to provide additional context for various aspects of the present invention, FIG. 11 and the following discussion are intended to provide a brief, general description of a suitable operating environment 1110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples the system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates classifying messages in connection with spam prevention, comprising:
    memory operatively coupled to a processor;
    a component that receives a set of the messages;
    a first classification component that identifies a subset of the messages as SPAM or flagged for further analysis, and temporarily delays further classification of the subset of messages; and
    a second classification component that after a delay period classifies the subset of messages by employing a filter that is updated during the delay period based at least in part on one or more learning techniques that are employed to receive additional data associated with the subset of messages during the determined delay period, the additional data includes data based on an analysis of the subset of messages, the delay period is dynamically determined based in part on at least one of a probability that the set of messages are spam, a time of next filter update, a time of next filter download and a level of uncertainty associated with the subset of messages, the determined delay period is reduced when determined that the subset of messages have been quarantined by one or more server filters,
    the memory retains at least a portion of at least one of the component, the first classification component or the second classification component.

2. The system of claim 1, the second classification component identifying some of the subset of messages as good based on a lack of sufficient new negative information.

3. The system of claim 2, wherein the lack of sufficient new negative information comprises the lack of appearance of similar messages in honeypots.

4. The system of claim 2, wherein the lack of sufficient new negative information comprises a lack of user complaints on similar information.

5. The system of claim 2, the lack of sufficient new negative information comprises information from polling users about at least a subset of messages.

6. The system of claim 5, the messages are classified as similar based on the sender's identity.

7. The system of claim 6, the sender's identity is classified based on his IP address.

8. The system of claim 5, the similarity of messages is based on the URLs contained in the messages.

9. The system of claim 2, the lack of sufficient new negative information comprises a low volume of similar messages.

10. The system of claim 1, the second classification component identifying some of the subset of messages as good based on new positive information other than a close match to a good message.

11. The system of claim 1, the messages are classified as spam or flagged or delayed based on a lack of information.

12. The system of claim 1, the messages are reclassified based on updated information from a machine learning spam filter.

13. The system of claim 1, messages initially classified as spam are deleted based on new information.

14. The system of claim 1, the spam is permanently deleted.

15. The system of claim 1, the spam is moved to a deleted messages folder.

16. The system of claim 1, further comprising a feedback component that receives information relating to the first and/or second classification component(s)', and employs the information in connection with training a spam filter or populating a spam list.

17. The system of claim 1, wherein the messages comprise at least one of: electronic mail (e-mail) and messages.

18. The system of claim 1, wherein the component that receives a set of the messages is any one of an e-mail server, a message server, and client e-mail software.

19. The system of claim 1, further comprising a quarantine component that quarantines the subset of messages based at least in part upon identification as flagged for further analysis by the first classification component.

20. The system of claim 1, the quarantining effected via placing the subset of messages in a folder separate from other messages.

21. The system of claim 1, the folder is visible or invisible to a user.

22. The system of claim 1, further comprising an identification component that identifies a source associated with a high occurrence of the subset of messages.

23. The system of claim 1, further comprising a time-stamp component that stamps an original arrival date on a message and a release date when the message is classified as good by the second classification component, the message sorted by the release date.

24. The system of claim 1, the subset of messages excludes at least one of messages from senders on safelists, messages readily identified and classified as spam, messages readily identified and classified as good.

25. The system of 1, the first classification component determines length of delay before classification of the subset of messages is performed.

26. The system of claim 25, the length of delay is based at least in part upon at least one of the following:
amount of time until a next scheduled filter update;
amount of time until download of new or updated filter; and
spam probability score assigned to respective messages in the subset.

27. A server that facilitates classifying messages in connection with spam prevention, comprising:
memory operatively coupled to a processor;
a component that receives a set of the messages;
a first classification component that identifies a subset of the messages as SPAM or flagged for further analysis, and temporarily delays further classification of the subset of messages; and
a second classification component that after a delay period classifies the subset of messages by employing a filter that is updated during the delay period based at least in part on one or more learning techniques that are employed to receive additional data associated with the subset of messages during the determined delay period, the additional data includes data based on an analysis of the subset of messages, the delay period is dynamically determined based in part on a time of next filter update, the determined delay period is reduced when determined that the subset of messages have been quarantined by one or more server filters,
wherein the memory retains at least a portion of at least one of the component, the first classification component or the second classification component.

28. An e-mail architecture that facilitates classifying messages in connection with spam prevention, comprising:
memory operatively coupled to a processor;
a component that receives a set of the messages;
a first classification component that identifies a subset of the messages as SPAM or flagged for further analysis, and temporarily delays further classification of the subset of messages; and
a second classification component that after a delay period classifies the subset of messages by employing a filter that is updated during the delay period based at least in part on one or more learning techniques that are employed to receive additional data associated with the subset of messages during the determined delay period, the additional data includes data based on an analysis of the subset of messages, the delay period is dynamically determined based in part on a level of uncertainty associated with the subset of messages, the determined delay period is reduced when determined that the subset of messages have been quarantined by one or more server filters,
the memory retains at least a portion of at least one of the component, the first classification component or the second classification component.

29. A computer readable storage medium having stored thereon the components that facilitates classifying messages in connection with spam prevention, comprising:
a component that receives a set of the messages;
a first classification component that identifies a subset of the messages as SPAM or flagged for further analysis, and temporarily delays further classification of the subset of messages; and
a second classification component that after a delay period classifies the subset of messages by employing a filter that is updated during the delay period based at least in part on one or more learning techniques that are employed to receive additional data associated with the subset of messages during the determined delay period, the additional data includes data based on an analysis of the subset of messages, the delay period is dynamically determined based in part on a time of next filter download, the determined delay period is reduced when determined that the subset of messages have been quarantined by one or more server filters.

30. A method for classifying messages, comprising:
receiving a set of messages to classify; based on lack of sufficient information, temporarily delaying classification on at least a subset of the messages as either spam or good or initially classifying the subset of messages as untrustworthy or suspicious;
dynamically determining a delay time period based at least in part upon a probability that the subset of messages are spam; and
classifying the untrustworthy or suspicious subset of messages as spam or good after the determined delay period by employing a client filter that is updated during the delay period based at least in part on one or more learning techniques that are employed during the determined delay period to receive additional data associated with the subset of messages, the one or more learning techniques include at least one of monitoring the subset of the messages with respect to at least one of volume per sender or similarities among quarantined messages, or analyzing the subset of the messages for at least one of their content or origination information; and
reducing the delay time period associated with the client filter for a message when determined that one or more server filters have quarantined a message for a time period.

31. The method of claim 30, further comprising a machine learning filter trained to determine the likelihood of quarantining aiding a correct eventual classification.

32. The method of claim 30, further comprising resuming classification when at least one of the following occurs:
a quarantine period elapses; and
additional information about the subset of messages has been obtained to facilitate classification of the respective messages in the subset as either spam or good.

33. The method of claim 30, the subset of messages excluding messages that is readily classified as spam or good or is from senders on a safelist.

34. The method of claim 30, temporarily delaying classification of the message when based at least in part upon at least one of the following:
sender's IP address on the message has not been seen before;
sender's domain has not been seen before;
sender's domain lacks a reverse IP address;
a forward lookup on the sender's domain does not at least approximately match the sender's IP address;
the message comprises at least one of an embedded domain name, an embedded macro, and an executable file;
the message comprises conflicting evidence of good and spam messages;
the message originates from a location associated with spam;
the message is written in a language associated with spam;
the message comprises primarily an image; and
the message comprises HTML.

35. The method of claim 30, further comprising delivering at least a subset of suspicious messages 36. The method of claim 35, the subset of suspicious messages is delivered to their respective intended recipients and their actions facilitate determining whether the subset of messages is spam or good.

37. The method of claim 35, the subset of messages for which feedback is sought is a fixed percentage of messages or a fixed quantity of messages per sender that are temporarily delayed from classification.

38. The method of claim 35, the subset of messages for which feedback is sought is allowed to get through without classification as either spam or good to facilitate learning more about the messages.

39. A computer executable API stored on a computer readable storage medium that facilitates classifying messages by quarantining, comprising:
calculating a spam probability score for incoming messages;
quarantining at least a subset of messages based at least in part upon their respective spam probability scores;
dynamically recommending a quarantine time based in part on at least one of a probability that the set of messages are spam, a time of next filter update, a time of next filter download or a level of uncertainty associated with the subset of messages;
updating one or more spam filters during the quarantine time based at least in part on one or more learning techniques that are employed during the quarantine time to receive additional data associated with the subset of messages;
classifying the quarantined subset of messages as good or spam after the quarantine time by employing the one of more updated spam filters; and
communicating between server and client that one or more server filters have quarantined a message for a time period so that the one or more client filters reduce quarantine time for the message.

40. The API of claim 39, further comprising quarantining at least a subset of messages until the next filter download, at which time the filter determines whether to continue quarantining or resume classification of the messages; and repeating until a final classification of either spam or good is made.

41. A computer implemented system for classifying messages, comprising:
means for receiving a set of messages to classify;
means for based on lack of sufficient information, temporarily delaying classification on the set of message as either spam or good or initially classifying the set of message as untrustworthy or suspicious;
means for dynamically determining a delay period based in part on at least one of a probability that the set of messages are spam, a time of next filter update, a time of next filter download and a level of uncertainty associated with the set of messages;
means for classifying the untrustworthy or suspicious subset of messages as spam or good after the determined delay period based at least in part on one or more learning techniques employed during the determined delay period to receive additional data associated with the subset of messages, the additional data includes message volume;
means for creating a sub-filter by employing training data generated by user and system analysis, the sub-filter is trained on one or more features extracted from the untrustworthy or suspicious messages;
means for applying the sub-filter to the untrustworthy or suspicious messages to classify the untrustworthy or suspicious messages as good or spam;
means for communicating between server and client to determine messages that are quarantined by one or more server filters for a time period;
means for reducing the determined delay period for the determined message; and
memory operatively coupled to a processor retains at least one of the means.

* * * * *